US009723808B2

(12) United States Patent
Nakata et al.

(10) Patent No.: US 9,723,808 B2
(45) Date of Patent: Aug. 8, 2017

(54) WATER ABSORBENT SHEET RETAINING MAT

(71) Applicant: TARKY CO., LTD., Osaka (JP)

(72) Inventors: Tsuyoshi Nakata, Osaka (JP); Seiji Nonoguchi, Osaka (JP)

(73) Assignee: TARKY CO., LTD., Osaka (JP)

( * ) Notice: Subject to any disclaimer, the term of this patent is extended or adjusted under 35 U.S.C. 154(b) by 31 days.

(21) Appl. No.: 14/406,676

(22) PCT Filed: Feb. 8, 2013

(86) PCT No.: PCT/JP2013/000717
§ 371 (c)(1),
(2) Date: Dec. 9, 2014

(87) PCT Pub. No.: WO2014/122696
PCT Pub. Date: Aug. 14, 2014

(65) Prior Publication Data
US 2015/0107523 A1    Apr. 23, 2015

(51) Int. Cl.
*A01K 1/01*    (2006.01)
*B01J 20/28*    (2006.01)
(Continued)

(52) U.S. Cl.
CPC .......... *A01K 1/0107* (2013.01); *A01K 1/0157* (2013.01); *A01K 29/00* (2013.01); *B01J 20/28033* (2013.01)

(58) Field of Classification Search
CPC ...... A01K 1/0107; A01K 1/011; A01K 1/015; A01K 1/0157; A01K 1/035; A01K 1/0353; A01K 29/00; A47L 13/254; A47L 13/256
(Continued)

(56) References Cited

U.S. PATENT DOCUMENTS 3,099,855 A * 8/1963 Nash ...................... A47L 13/29
15/231
5,482,007 A * 1/1996 Kumlin ................ A01K 1/0107
119/169

(Continued)

FOREIGN PATENT DOCUMENTS

CN    100528064    8/2009
EP    1230845    1/2002
(Continued)

OTHER PUBLICATIONS

EPO Search Report mailed Jun. 2, 2015 in European Patent Application No. 13874334.9.
(Continued)

*Primary Examiner* — Joshua Rodden
(74) *Attorney, Agent, or Firm* — Greenblum & Bernstein, P.L.C.

(57) ABSTRACT

Provided is a water absorbent sheet retaining mat which can retain a water absorbent sheet easily and surely. A water absorbent sheet retaining mat for retaining a water absorbent sheet having a first polygonal contour, includes: a mat member having a second polygonal contour defined by mutually opposing a first main plane and a second main plane; and at least one retaining member having a slit member including at least one slit formed in a top surface at a first predetermined height from the second main plane for accepting a part of perimeter of the water absorbent sheet being inserted therein.

11 Claims, 18 Drawing Sheets

(51) Int. Cl.
*A01K 29/00* (2006.01)
*A01K 1/015* (2006.01)

(58) Field of Classification Search
USPC .................................................. 119/28.5, 169
See application file for complete search history.

(56) References Cited

U.S. PATENT DOCUMENTS

| | | | |
|---|---|---|---|
| 6,305,046 B1 | 10/2001 | Kingry et al. | |
| 6,450,119 B1 * | 9/2002 | Holt, Jr. | A01K 1/0353 119/28.5 |
| 6,484,346 B2 * | 11/2002 | Kingry | A47L 13/46 15/228 |
| 6,645,597 B1 | 11/2003 | Swain | |
| 7,249,570 B1 * | 7/2007 | Roberson | A01K 1/0107 119/169 |
| 7,267,077 B1 * | 9/2007 | Brassfield | A01K 1/033 119/28.5 |
| 7,559,290 B2 * | 7/2009 | West | A01K 1/0353 119/28.5 |
| 8,113,146 B2 * | 2/2012 | Askinasi | A01K 1/0157 119/165 |
| 2002/0138934 A1 * | 10/2002 | Petner | A47L 13/44 15/229.6 |
| 2006/0090279 A1 * | 5/2006 | Nishinaka | A47L 9/02 15/231 |
| 2008/0178818 A1 | 7/2008 | Aley | |
| 2010/0300367 A1 | 12/2010 | Askinasi | |
| 2013/0327278 A1 * | 12/2013 | Reichert | A01K 1/0114 119/167 |
| 2014/0053785 A1 | 2/2014 | Christianson et al. | |

FOREIGN PATENT DOCUMENTS

| | | |
|---|---|---|
| GB | 2470646 | 1/2010 |
| JP | 9-56654 | 3/1997 |
| JP | 3068906 | 5/2000 |
| JP | 2006-122355 | 5/2006 |
| JP | 2007-110929 | 5/2007 |
| JP | 2012-130285 | 7/2012 |

OTHER PUBLICATIONS

"How to use a Pefami toilet mat—YouTube," retrieved on May 7, 2013 and English translation thereof.
Office Action issued in China Counterpart Patent Appl. No. 201380040314.8, dated Aug. 2, 2016.

* cited by examiner

--PRIOR ART--

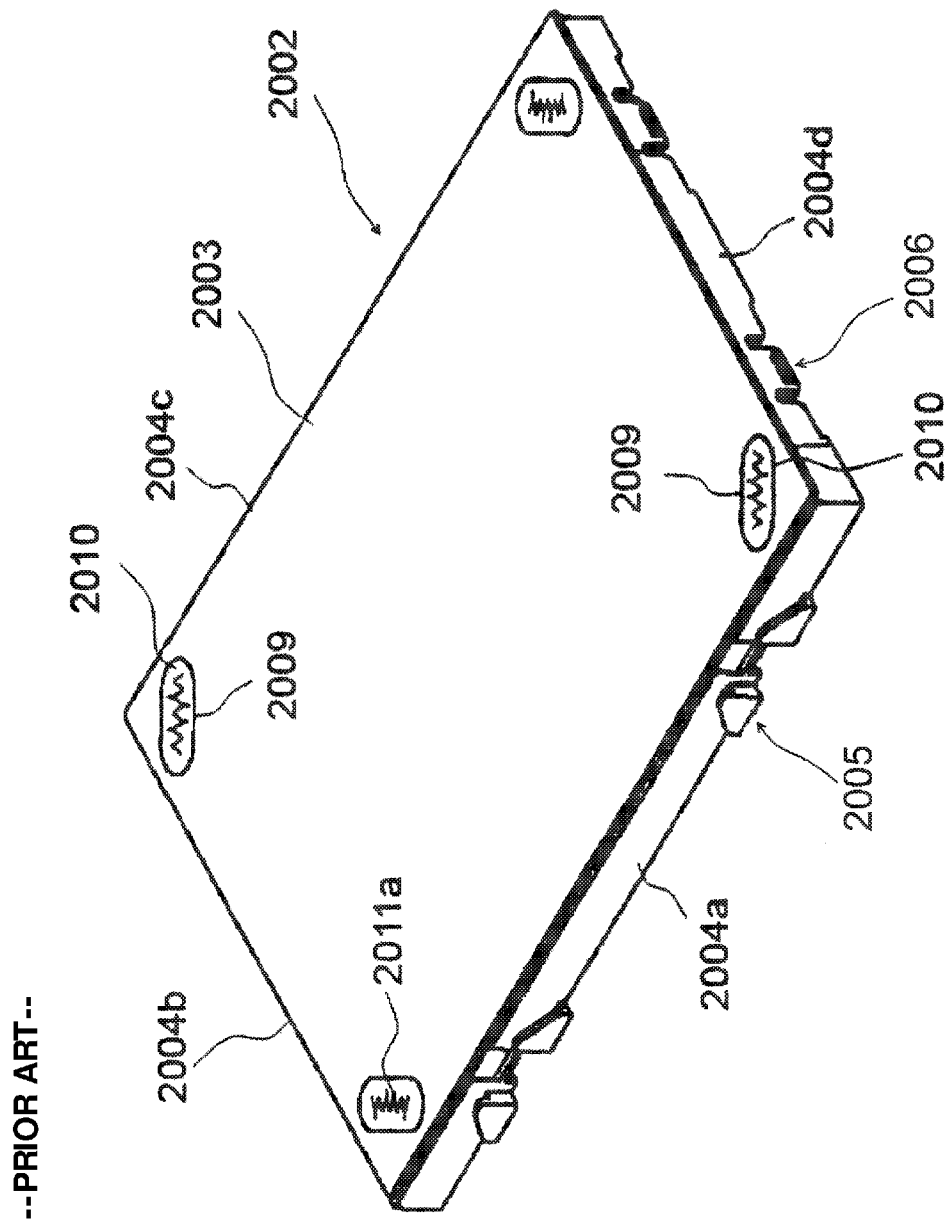
Fig. 18 --PRIOR ART--

WATER ABSORBENT SHEET RETAINING MAT

FIELD

The present invention relates to a mat used for retaining a water absorbent sheet, and more particularly, to a water absorbent sheet retaining mat for retaining a water absorbent sheet for a pet.

BACKGROUND

When handling a liquid indoors, usually a sheet having a capacity to absorb or soak up water (hereinafter referred to as a "water absorbent sheet") is laid on an object which would be suffered from being wet such as a floor or a table for protecting it from the water. However, such aim will not be achieved when a liquid amount to be absorbed exceeds the capacity of the water absorbent sheet or when the water absorbent sheet shifts from the proper position. Typical cases of such shifts are that a pet moves the water absorbent sheet during feeding or excreting thereon. The water absorbent sheet which is broken by the pet comes upon the same situation in which the liquid amount to be absorbed exceeds the capacity thereof. Toilet mats for a pet are proposed by Patent Literature 1 and Patent Literature 2 for proactively counter the above cases.

As shown in FIG. 16 and FIG. 17, the toilet mat for a pet proposed by Patent Literature 1 is used in a state in which a toilet sheet for a pet is laid on an upper surface thereof. The toilet mat for a pet 1001 includes a main body formed in almost a rectangular shape, and a pair of fixtures 1011a and 1011b for retaining the toilet sheet for a pet 1002 on the main body. The main body is made with a material, preferably has water repellency, which is well durable and easy to change the shape for convenience of carrying. Provided with are magnets 112 to the main body, and magnets 111 to the fixtures 1011a and 1011b.

Installation of the toilet sheet for a pet 1002 in the toilet mat for a pet 1001 is made in a manner below. After the toilet sheet for a pet (hereinafter referred to as a "toilet sheet") 1002 is laid on the upper surface of the main body, the fixtures 1011a and 1011b are located in the positions over the laid sheet 1002 so that the magnets 111 position above the magnets 112. Then, the fixtures 1011a and 1011b are let down toward the main body so that the magnets 111 and 112 stick to each other. An attraction force working between the magnets 111 and 112 generates a frictional force between the toilet sheet 1002 and the magnets 111 and 112. The toilet sheet 1002 is fixed on and retained by the toilet mat for a pet 1001 by the frictional force. The toilet sheet 1002 can be removed from the main body after the fixtures 1011a and 1011b are detached from the main body.

The fixtures 1011a and 1011b, when the magnets 111 and 112 are not provided therein, press the toilet sheet 1002 against the toilet mat for a pet 1001 by the self weight thereof, causing the frictional force between the toilet sheet 1002 and the fixtures 1011a and 1011b to fix the toilet sheet 1002 thereat. To prevent the toilet sheet 1002 from shifting due to the pet's motion, it is devised that the frictional force is increased by increasing the weight of the fixtures 1011a and 1011b to increase the fixing force of the toilet sheet 1002. When the magnets 111 and 112 are provided, it is devised to increase the magnetism thereof to increase the frictional force.

As shown in FIG. 18, a toilet mat for a pet 2001 (not shown) of Patent Literature 2 is used in a state in which a toilet sheet for a pet is laid on an upper surface thereof, as the toilet mat for a pet of Patent Literature 1 is. The toilet mat for a pet 2001 is constructed of at least four units of substrate 2002. The substrate 2002 includes peripheral walls 2004a to 2004d provided on a bottom on a perimeter of a rectangular planar shaped top plate 2003 so as to vertically extrude from a bottom side of the top plate 2003, and is made of a synthetic resin as a base for retaining the toilet sheet placed on the upper surface of the top plate 2003.

A sheet fixture 2010 fits in each of mounting holes 2009 bored with an oval sectional shape in each of four corners of the upper surface of the top plate 2003. Two oval shaped sheet fixtures 2010 are located on each diagonal line of the top plate 2003 such that the straightaway sections of the oval shape oppose to each other. The sheet fixture 2010 is provided with a cut portion 2011a formed from the upper surface to the bottom surface thereof. The toilet sheet placed on the upper surface of the top plate 2003 is retained onto the substrate 2002 such the four corners of the sheet are inserted in the cut portions 2011a.

Four units of substrate 2002 are assembled into the toilet mat for a pet 2001 (not shown) by joining a first connection member 2005 or a second connection member 2006 provided in peripheral walls 2004a to 2004d to the first connection member 2005 or the second connection member 2006 provided in peripheral walls 2004a to 2004d of another discrete substrate 2002. The outermost four units of sheet fixture 2010 (cut portions 2011a), among sixteen units of sheet fixture 2010 available on the toilet mat for a pet 2001 comprised of four units of substrate 2002, retains the water absorbent sheet placed over the toilet mat for a pet 2001.

CITATION LIST

Patent Literature

Patent Literature 1: Japanese Patent Application Laid-Open No. 2007-110929
Patent Literature 2: Japanese Registered Utility Model No. 3068906

SUMMARY

Technical Problem

Patent Literature 1 discloses a toilet mat for a pet that forces a user to remove and install fixtures every time to get on and off a toilet sheet. The fixtures are separately provided from the main body of toilet mat, and are placed on a toilet sheet when in use. Thus, the fixtures would become dirty by pet's excrements, and cleaning is required. There is a possibility that the fixtures, separately provided from the main body of the toilet mat, are lost during cleaning the fixtures or exchanging the toilet sheet.

Furthermore, although the magnets are provided as a means for positioning the fixtures on the main body of the toilet mat, the magnets provided in the main body of the toilet mat sit under the toilet sheet, disabling the user from visual observation thereof during the installation of the fixtures. In addition to this, the toilet sheet should be greater than the distance between the magnets to be fixed on the toilet mat by the fixtures, limiting the size of toilet sheet could be used.

For preventing the position shifting, it is required to increase the weight of fixtures or to strengthen the magnets. The weight of fixtures is increased, lessened is the portability of the toilet mat as well as increased is the load to the operator during the installation or uninstallation of the fixtures. Although strengthening of the magnets will not affect the portability of the toilet mat, a high-strength magnetism makes the working load of installing or removing the fixtures heavier and requires a consideration of the influence on the magnetic products therearound.

In the toilet mat for a pet disclosed by Patent Literature 2, the sheet is retained such that the corner thereof is inserted in the cut portion formed in the sheet fixture positioned in the four corners of the substrate or the toilet mat. Therefore, the perimeter of thus retained sheet is located at a position floating from the top plate (substrate or toilet mat). In short, a gap opening outwardly is formed between an outer perimeter of the sheet and the top plate (substrate or toilet mat) except the portions being inserted in the cut portion. Therefore, the pet may be caught by the outer perimeter of the sheet at its mouth or foot when the pet gets on or moves on the retained sheet, causing the sheet shift from the position and remove from the cut portion.

In the light of the above mentioned problems, an object of the present invention is to provide a water absorbent sheet retaining mat that can retain a water absorbent sheet easily and surely.

Solution to Problem

In order to achieve the above-described object, the water absorbent sheet retaining mat for retaining a water absorbent sheet having a first polygonal contour according to the present invention, comprises a mat member having a second polygonal contour defined by mutually opposing a first main plane and a second main plane; and at least one retaining member having a slit member comprised of at least one slit formed in a top surface at a first predetermined height from the second main plane for accepting a part of perimeter of the water absorbent sheet being inserted therein, wherein the water absorbent sheet is laid on the first main plane.

Advantageous Effects of Invention

The present invention can provide a water absorbent sheet retaining mat which can retain a water absorbent sheet easily and surely.

BRIEF DESCRIPTION OF DRAWINGS

FIG. 18 is a perspective view of a toilet mat for a pet proposed by Patent Literature 2.

DESCRIPTION OF EMBODIMENTS

First Embodiment

With reference to FIG. 1, FIG. 2, FIG. 3, FIG. 4, FIG. 5, FIG. 6, FIG. 7, FIG. 8, FIG. 9, and FIG. 10, a water absorbent sheet retaining mat according to a first embodiment of the present invention is described below. First, a technical concept of the present invention is explained with reference to FIG. 1. A water absorbent sheet retaining mat M1 according to the present invention, aiming to able to retain a water absorbent sheet having a predetermined polygonal contour easily and surely, includes a mat member Pm1 with a plane St on which a water absorbent sheet Sa1 is laid (hereinafter referred to as a "laying plane St"), and a retaining member Pr1 which retains the water absorbent sheet Sa1.

The mat member Pm1 has a predetermined polygonal contour, and is formed in a flat plate like shape having a thickness t1 and being defined by the laying plane St (FIG. 2) which is the first main plane and the second main plane Sb opposed to and apart from the laying plane St by a predetermined distance t1. The second main plane Sb (hereinafter referred to as a "sitting plane Sb") of the mat member Pm1 is a plane which contacts a place where the water absorbent sheet retaining mat M1 is sit. At least one of the retaining member Pr1, formed in a block like shape having a predetermined height t2, is provided on the sitting plane Sb. A cut S (a slit member S) is provided in a top surface of the retaining member Pr1 high above the laying plane St by a predetermined distance t3 (t3=t1+t2).

The water absorbent sheet Sa1 is installed in the water absorbent sheet retaining mat M1 in a following manner. The water absorbent sheet Sa1 is located so as to oppose to the laying plane St, and then an end portion Esa of the water absorbent sheet Sa1 is wrapped around a perimeter of the mat member Pm1 so that the end portion Esa of the water absorbent sheet Sa1 opposes to the sitting plane Sb. Then, at least a part of the end portion Esa of the water absorbent sheet Sa1 is inserted in the cut S of the retaining member Pr1. The water absorbent sheet retaining mat M1 with the water absorbent sheet Sa1 installed therein is used in such a state that the sitting plane Sb is in contact with a place such as a floor where the water absorbent sheet retaining mat M1 is laid. The structure of the water absorbent sheet Sa1 is described later.

Figure 1:
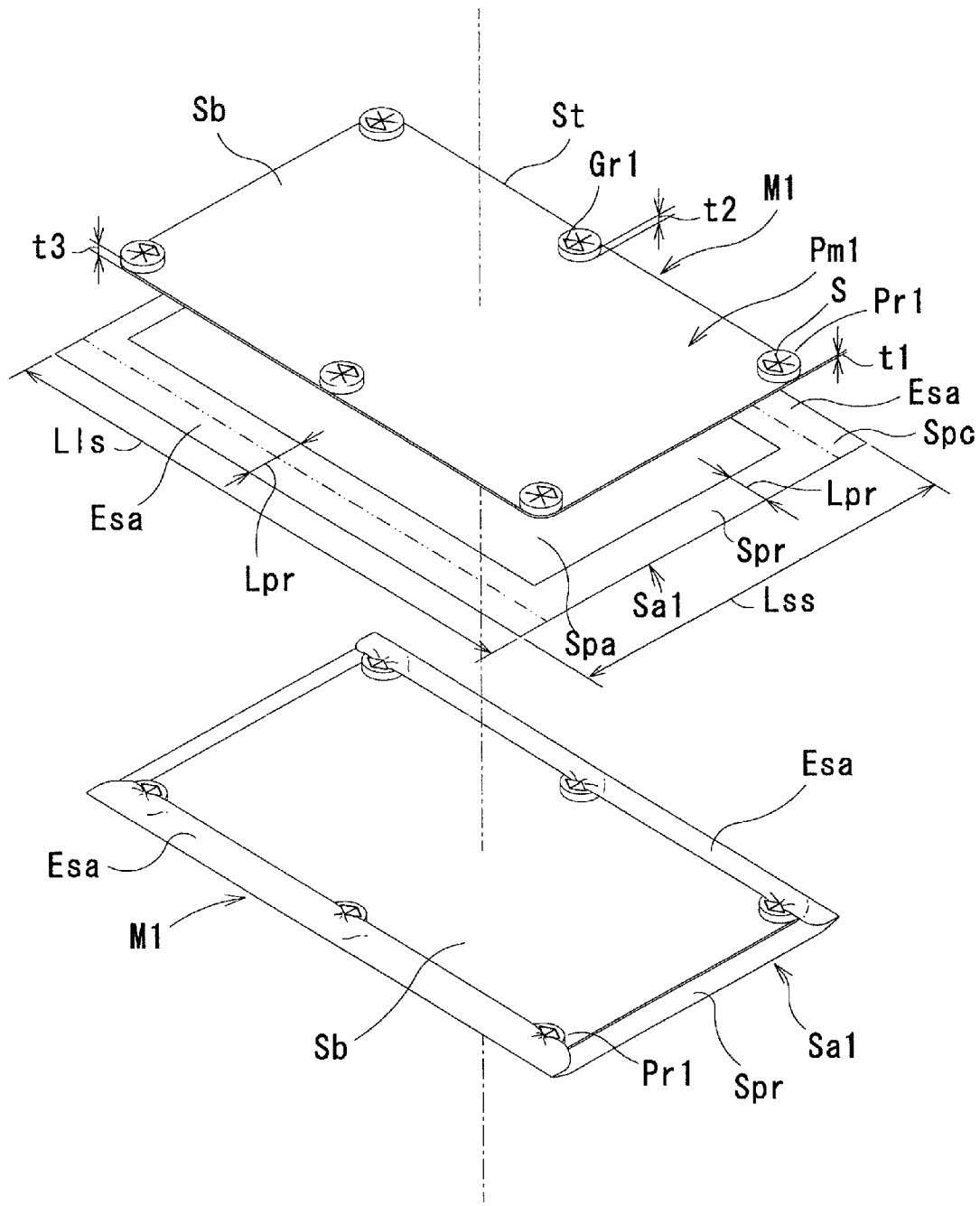
FIG. 1 is a perspective view showing a state in which a water absorbent sheet retaining mat according to a first embodiment of the present invention is used.

Note that the water absorbent sheet Sa1 and the mat member Pm1 each could be formed in an arbitrary shape other than a rectangular shape depicted in FIG. 1. The mat retaining member Pm1 is constructed to have an outer shape smaller than an outer shape of the water absorbent sheet Sa1. The retaining member Pr1 is provided on the sitting plane Sb such that the perimeter of the mat member Pm1 and a perimeter of the retaining member Pr1 partially coincide with each other.

As described above, in the water absorbent sheet retaining mat M1, the retaining members Pr1 (the fixtures) with the cut S formed in the top surface thereof are provided not separately from the mat member Pm1 (a toilet mat for a pet) but in a position above the sitting plane Sb of the mat member Pm1. As a result, workings of installing or removing the retaining members Pr1 required every time for fixing and unfixing the water absorbent sheet Sa1 becomes unnecessary as well as the risk of losing the retaining member Pr1 during the cleaning is eliminated. Retaining of the water absorbent sheet Sa1 is achieved by inserting a portion of the water absorbent sheet Sa1 in the cut S in the top surface of the retaining member Pr1. Thus, both the cut S and the to-be inserted portion of the water absorbent sheet Sa1 can be visually observed without difficulty and the working of retaining (insertion) of the water absorbent sheet Sa1 can be carried out easily and surely.

Further, the end portion Esa of the water absorbent sheet Sa1 is retained by being caught between the sitting plane Sb and the place where the water absorbent sheet retaining mat M1 is laid, as well as by being pinched by the cut S provided in the retaining member Pr1 at the top surface where the friction with the water absorbent sheet Sa1 is produced. It is a force acting not in the vertical direction but in opposite directions almost parallel to the laying plane St and the sitting plane Sb that will be applied to the end portion Esa of the water absorbent sheet Sa1 even when a pet moves on or pulls the water absorbent sheet Sa1.

Specifically, since the water absorbent sheet Sa1 is turned down along the perimeter of the water absorbent sheet retaining mat M1, the water absorbent sheet Sa1 tends to move in a centripetal direction on the side of laying plane St and in a centrifugal direction on the side of sitting plane Sb when the pet pulls the water absorbent sheet Sa1 toward a center of the water absorbent sheet retaining mat M1 for example. Due to the turning down of the water absorbent sheet Sa1 along the outer edge of the water absorbent sheet retaining mat M1, the motion of the water absorbent sheet Sa1 is reversed through the turned down portion. In short, a direction in which a force is applied to the water absorbent sheet Sa1 is changed to the opposite direction at the turned down portion. Therefore, a greater frictional force will work between the water absorbent sheet retaining mat M1 and the water absorbent sheet Sa1 at the turned down portion.

Furthermore, the weights of the water absorbent sheet retaining mat M1 and the pet are applied to a perimeter (mainly the retaining member Pr1) of the sitting plane Sb of the water absorbent sheet retaining mat M1 so that the end portion Esa of the water absorbent sheet Sa1 is pressed against the place where the water absorbent sheet retaining mat M1 is placed.

As described in the above, a clamping force caused by the perimeter (mainly the retaining member Pr1) of the sitting plane Sb of the water absorbent sheet retaining mat M1 acts as a resistant force preventing the water absorbent sheet Sa1 from slipping out of the retaining member Pr1 together with the forces caused by a friction as well as the reversing of the moving direction of the water absorbent sheet Sa1 by the turned down portion. Therefore, the water absorbent sheet retaining mat M1 does not need weight increasing of the fixtures or magnetism strengthening for securing enough retaining force.

Since the mat member Pm1 is smaller than the water absorbent sheet Sa1 to be retained, a single of the mat member Pm1 can retain any of the water absorbent sheet Sa1 in all sizes as formed as smaller than the smallest one of the water absorbent sheet Sa1.

The water absorbent sheet retaining mat M1 is constructed of a waterproof and flexible material. The waterproofness is required for preventing a liquid from permeating, and the flexibility is required for retaining the water absorbent sheet Sa1 surely and stably by being deformed along a shape of the plane on which the water absorbent sheet retaining mat M1 is laid. Further, safety and corrosion proof is preferably required for the material of which the water absorbent sheet retaining mat M1 is made. The safety comes from a consideration of that a pet may lick the water absorbent sheet retaining mat M1 used for the same purposes as the conventional toilet mat for a pet. The corrosion proof is for withstanding the applied liquid (such as a pet's urine and so on). The water absorbent sheet retaining mat M1, according to the embodiments of the present invention, is implemented of silicon rubber.

The water absorbent sheet Sa1 includes an area served for water absorption (hereinafter referred to as an "absorption area") Spa and a sheet brim member Spr. The absorption area Spa has a polygonal contour smaller than that of the water absorbent sheet Sa1, and is provided substantially at the center thereof. A width of the sheet brim member Spr, a distance between the absorption area Spa and the outer perimeter of the water absorbent sheet Sa1 is designated as a sheet brim width Lpr. According to this embodiment, the absorption area Spa is formed in a rectangular shape defined by a short side and a long side. The sheet brim member Spr is provided to surround the absorption area Spa. The water absorbent sheet Sa1 is constructed with a front surface made of a liquid permeable material such as a non-woven fabric, and a back surface made of a liquid non-permeable material such as nylon and a vinyl. Included in the absorption area Spa is an absorbent material such as a high polymer. The water absorbent area Spa is arranged concentrically to the outer shape of the water absorbent sheet Sa1. The water absorbent sheet Sa1 has four corners Spc.

As the water absorbent sheet Sa1, suitable goods on the market can be used. The water absorbent sheets on the market fall roughly into two groups with respect to the size. One is a regular size group including regular sized sheets, and the other is a wide size group including wide, greater than the regular, sized sheets. The water absorbent sheets Sa1 in the regular size have the outer contours as large as about a rectangular whose short side Lss is 310 mm to 330 mm, and long side Lls is 440 mm to 450 mm. The water absorbent sheets Sa1 in the wide size have the outer contours as large as about a rectangular whose short side Lss is 430 mm to 450 mm, and long side Lls is 590 mm to 600 mm. The width Lpr of the sheet brim member Spr is about 20 mm to 30 mm.

The retaining member Pr1 is provided on such a position that the water absorbent sheet Sa1 constructed as above can be laid with the back surface thereof is in contact with the laying plane St of the mat member Pm1 and the end portion Esa can be inserted in the slit member S when the water absorbent sheet Sa1 is wrapped so as to oppose the end portion Esa to the sitting plane Sb. By being the end portion Esa and also the corner portion Spc as necessary inserted in the slit member S, the water absorbent sheet Sa1 is positioned and retained on the water absorbent sheet retaining mat M1. The retaining member Pr1 is preferably provided on the sitting plane Sb so that the outer perimeters of the mat member Pm1 and the retaining member Pr1 partially coincide with each other.

At least one unit of retaining member Pr1 is enough for retaining the water absorbent sheet Sa1 on the water absorbent sheet retaining mat M1. However, preferably plural retaining members Pr1 are provided so that the end portion Esa of the water absorbent sheet Sa1 is caught securely between the sitting plane Sb and the place where the water absorbent sheet retaining mat M1 is laid. More preferably, plural retaining members Pr1 shall be provided on the opposite sides of the mat member Pm1. The retaining member Pr1 is provided with a grooved member Gr1 on the top surface thereof in addition to the above described slit member S. The shapes of the retaining member Pr1, the slit member S, and the grooved member Gr1 will be described later with FIG. 3 and FIG. 4.

Figure 2:
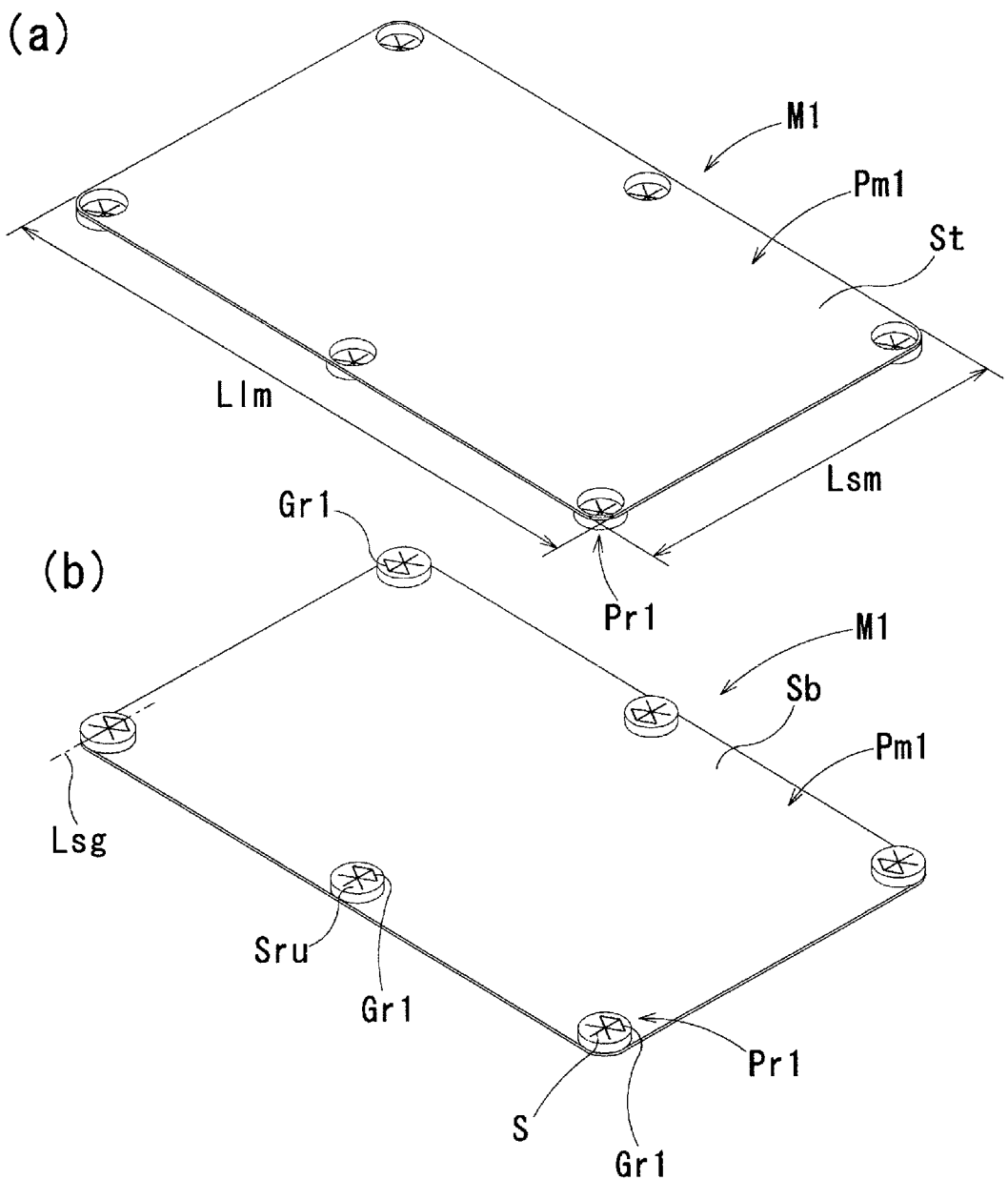
FIG. 2 is a perspective view showing the water absorbent sheet retaining mat depicted in FIG. 1.

Next, with reference to FIG. 1, and FIG. 2, described is a relationship between the dimensions of the water absorbent sheet Sa1 and the mat member Pm1. According to this embodiment, the mat member Pm1 is constructed to have the outer shape smaller than the outer shape of the water absorbent sheet Sa1. In other words, with respect to a short side Lsm (outer diameter) and a long side Llm (outer diameter) of the mat member Pm1, the following equations (1) and (2) are satisfied.

$$Lsm < Lss \quad (1)$$

$$Llm < Lls \quad (2)$$

The retaining member Pr1 is provided on such a position that the end portion Esa (the sheet brim member Spr) of the water absorbent sheet Sa1 can be inserted in the slit member S when the water absorbent sheet Sa1 is wrapped so as to oppose the end portion Esa of the water absorbent sheet Sa1 to the sitting plane Sb. Specifically, the retaining member Pr1 is provided on the sitting plane Sb so that a distance between a center of the slit member S and the outer perimeter of the mat member Pm1 is smaller than the sheet brim width Lpr.

The water absorbent sheet retaining mat M1 is provided with six units in total of retaining members Pr1 along the long sides Llm of the mat member Pm1, specifically three units per the side. Four among the six units of the retaining member Pr1 are located on the end portions of the long sides Llm of the mat member Pm1. The residual two units of retaining member Pr1 are located on about a center of each long side Llm. Two long sides Lls of the water absorbent sheet Sa1 is held to the retaining member Pr1 arranged on the corresponding long side Llm of the mat member Pm1. Two short sides Lss of the water absorbent sheet Sa1 can be held by being inserted in the slit member(s) S of the retaining members Pr1 arranged on the four corners of the mat member Pm1. It is also allowed that the short side Lss of the water absorbent sheet Sa1 is placed so as to be caught between the sitting plane Sb and the place where the water absorbent sheet retaining mat M1 is laid. It is also allowed that the retaining member Pr1 is provided in a predetermined position along the short side Lsm of the mat member Pm1 as well as along both the long side Llm and the short side Lsm.

The retaining member Pr1 has an external appearance of a cylinder like shape and rises almost perpendicularly from the sitting plane Sb at a predetermined height t2 (FIG. 1). Formed in a top surface Sru of the retaining member Pr1 are the slit member S in which a part of the water absorbent sheet Sa1 will be inserted and the grooved member Gr1.

Figure 3:
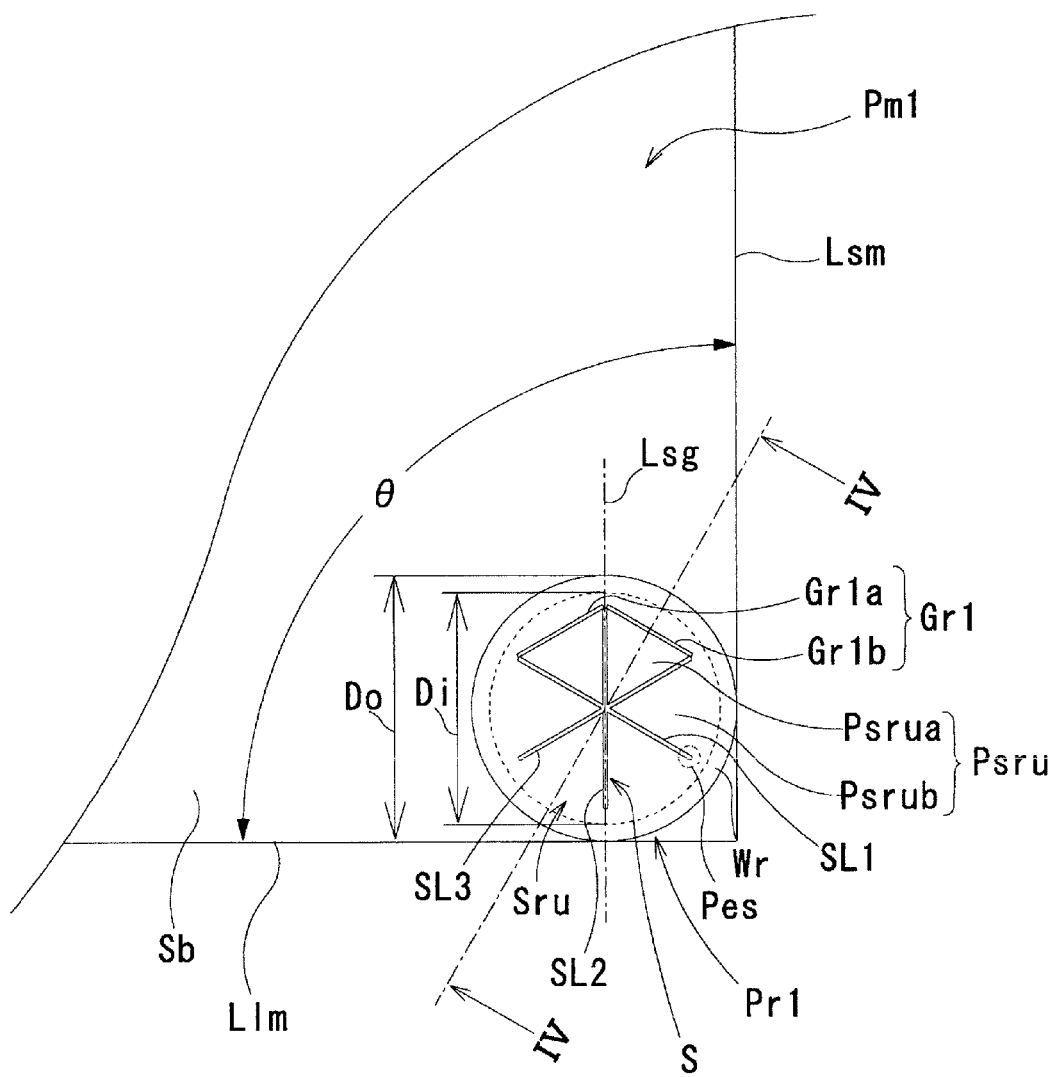
FIG. 3 is a plan view showing one example of a retaining member of the water absorbent sheet retaining mat depicted in FIG. 2.
Figure 4:
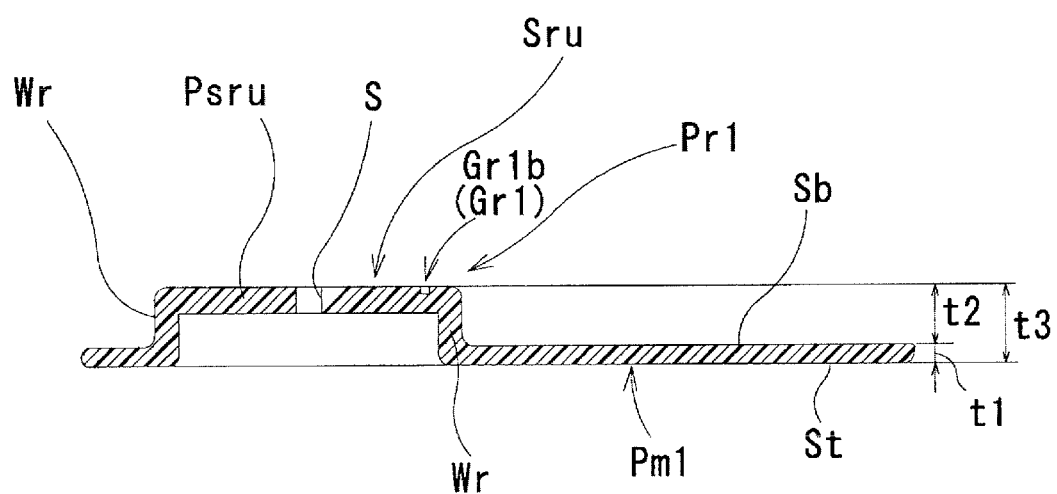
FIG. 4 is a sectional view of the retaining member depicted in FIG. 3.

With reference to FIG. 3 and FIG. 4, the shapes of the retaining member Pr1, the slit member S, and the grooved member Gr1 are described specifically. FIG. 3 is an enlarged plan view of the retaining member Pr1 located in the lower right part in FIG. 2(*b*), showing an example of the retaining member of the water absorbent sheet retaining mat for a pet. FIG. 4 shows a cross sectional construction of the retaining member Pr1 taken along a line IV-IV in FIG. 3.

According to the example shown in FIG. 3 and FIG. 4, the retaining member Pr1 is defined by an inner diameter Di, an outer diameter Do, and the height t2, and is composed of a peripheral wall Wr formed in a tubular shape and the top surface Sru. The inner diameter Di of the retaining member Pr1 should be about as large as to accept a finger of a person (a user of the water absorbent sheet retaining mat M1) therein. In this embodiment, the inner and outer diameters Di and Do of the retaining member Pr1 are set to 24 mm and 30 mm, respectively.

In the top surface Sru of the retaining member Pr1, provided is the slit member S, as described in the above. The slit member S is comprised of three slits SL1, SL2, and SL3 intersecting each other. The slits SL1, SL2, and SL3 define 6 pieces of claw Psru in the top surface Sru. The length and width of slits SL1, SL2, and SL3 are set to about 22 mm and about 0.5 mm to 1 mm, respectively. End portions Pes in the distal ends of each slit in the longitudinal direction is formed in a circular arc shape having a predetermined radius of curvature.

In the top surface Sru of the retaining member Pr1, provided in addition to the slit member S is the grooved member Gr1 having a groove extending between the end portions Pes of the neighboring two slits. In the example depicted in FIG. 3, among the end portions Pes of neighboring three slits SL1, SL2, and SL3, two units of groove Gr1*a* and Gr1*b* are formed. In short, the grooved member Gr1 includes the groove Gr1*a* and the groove Gr1*b*, and the end portions of the grooves Gr1*a* and Gr1*b* are adjacent to each other. The groove Gr1*a* is formed to extend from a neighborhood of the end portion Pes more on the center of the mat member Pm1 of the slit SL1 to a neighborhood of the end portion Pes more on the center of the mat member Pm1 of the slit SL2. The groove Gr1*b* is formed to extend from a neighborhood of the end portion Pes more on the center of the mat member Pm1 of the slit SL2 to a neighborhood of the end portion Pes of the slit SL3 adjacent to the aforementioned end portion Pes. A width of the grooved member Gr1 (groove Gr1*a* and groove Gr1*b*) is set to about 0.5 mm to 2 mm, and a depth thereof is set to about 0.5 mm to 2 mm. From FIG. 4, it is recognized that a cross sectional shape of the grooved member Gr1 (groove Gr1*b*) is rectangular.

Among six pieces of the claw Psru defined in the top surface Sru of the retaining member Pr1, two pieces of the claw Psru arranged near the center of the mat member Pm1 are provided with the groove Gr1*a* or the groove Gr1*b* formed in a root (fixed end side) thereof. Two pieces of the claw Psru with groove formed in the roots thereof (hereinafter referred to as a "claw with groove Psrua" each) is more easier to shift toward a direction perpendicular to the mat member Pm1 (the sides of the laying plane St and the sitting plane Sb) thanks to the grooved member Gr1, compared with the other four pieces of claw Psru (hereinafter referred to as a "claw without groove Psrub" each). This feature makes it easier for the user intentionally attaching/detaching the end portion Esa of the water absorbent sheet Sa1 to/from the retaining member Pr1. Furthermore, the water absorbent sheet Sa1 that is installed and laid on such a place as a floor for use is prevented from being accidentally removed against the user's intention.

Further, poses and positions of the grooved member Gr1 in the mat member Pm1 is described. As shown in FIG. 3, when continuous two sides intersecting with a predetermined angle θ adjacent to the retaining member Pr1 are regarded as a first side (long side Llm) and a second side (short side Lsm) in a polygonal contour of the mat member Pm1, respectively, an inter slit member—grooved member line Lsg connecting a center point of the grooved member Gr1 and a center of the slit member S crosses the first side Llm and the second side Lsm at an angle within a range from 0° to θ°. According to the example shown in FIG. 3, since the mat member Pm1 is rectangular as described in the above, the predetermined angle θ is 90° but is obviously determined to an arbitrary value according to actual shape of the polygonal contour. Further, the grooved member Gr1 is located on the centripetal side of the mat member Pm1 in the top surface Sru of the retaining member Pr1. Thanks to these features, the mat member Pm1 is easy-to-install/uninstall the water absorbent sheet Sa1 complying with the user's intention and is protected from an accidental removal of the water absorbent sheet Sa1 against the user's intention, which will be specifically described below.

When the end portion Esa of the water absorbent sheet Sa1 is inserted in the slit member S, two pieces of the claw with groove Psrua is easy to deform toward a space on the side of sitting plane Sb. Resultantly, even when the mat member Pm1 is held by a hand or is laid on a floor, the user can easily insert the end portion Esa in the slit member S, and then install the water absorbent sheet Sa1 to the retaining member Pr1. On the other hand, in the mat member Pm1 with the water absorbent sheet Sa1 being installed thereto, the claw Psru of the retaining member Pr1 is in contact with the place on which the water absorbent sheet retaining mat M1 is laid. When the pet makes action to pull the water absorbent sheet Sa1, causing a force to deform the claw Psru downward (toward the floor side). However, the downward deformation of the claw Psru is suppressed by a force made by the weight of the mat member Pm1 and the pet so as to press the claw against the floor.

Note that, due to the grooved member Gr1, the claw with groove Psrua is easier to deform than the claw without groove Psrub. In short, it is easy to lose the inserted water absorbent sheet Sa1. The claw with groove Psrua is arranged preferably on a position less subject to a force acting to remove the water absorbent sheet Sa1 caused by the pet. Due to that, according to this embodiment, the grooved member Gr1 is arranged near the center (centripetal side) of the mat member Pm1 as well as an angle that the inter slit member-grooved member line Lsg forms with the long side Llm and the short side Lsm of the mat member Pm1 is not greater than θ. Further, due to that the grooved member Gr1 is located near the center (centripetal side) of the mat member Pm1, a resistant force applied to the water absorbent sheet Sa1 is greater in a removal direction than in an insertion direction. Thus, the user can easily insert the water absorbent sheet Sa1 in the retaining member Pr1 (slit member S).

To install the water absorbent sheet Sa1 in the water absorbent sheet retaining mat M1, the end portion Esa of the water absorbent sheet Sa1 is inserted in the slit member S of the retaining member Pr1 with the back surface of the water absorbent sheet Sa1 opposite to the laying plane St, and then is further pushed toward the laying plane St. Therefore, the user's finger inserted in the slit member S together with the end portion Esa of the water absorbent sheet Sa1 becomes in contact with the back surface of the water absorbent sheet Sa1. By pushing the end portion Esa being inserted in the slit member S in a slant direction toward the outer perimeter's side of the mat member Pm1, the water absorbent sheet Sa1 is easily installed in the water absorbent sheet retaining mat M1.

In the top surface Sru, thanks to a construction that two pieces of the claw with groove Psrua are located near the center of the mat member Pm1, the claw with groove Psrua tends to shift to the side of the laying plane St, the claw with groove Psrua shifts to the side of laying plane St to form a space between the upper surface of two pieces of the claw with groove Psrua and the bottom surface of four pieces of the claw without groove Psrub when the end portion Esa of the water absorbent sheet Sa1 is inserted in the slit member S. Thus, the end portion Esa of the water absorbent sheet Sa1 can be easily pushed toward the outer perimeter side of the mat member Pm1 with the claw without groove Psrub being provided thereon.

The end portion Esa of the water absorbent sheet Sa1 being inserted in the slit member S is retained as being caught between the upper surface of two pieces of the claw with groove Psrua and the bottom surface of four pieces of the claw without groove Psrub. The water absorbent sheet Sa1 is hard to remove from the slit member S due to the friction and pinching with the claws Psru given a structural strength by the cylindrical peripheral wall Wr even when a force about parallel to the laying plane St of the mat member Pm1 exerts on the end portion Esa of the water absorbent sheet Sa1.

In the examples shown in FIG. 2 and FIG. 3, the slit member S and the grooved member Gr1 are constructed so that a line hereinafter referred to as an "inter slit member—grooved member line") Lsg connecting a center point of the slit member S and a center point of the grooved member Gr1 is about parallel to the short side Lsm of the mat member Pm1. However, the positions on which the slit member S and the grooved member Gr1 are arranged is not limited to those exampled in FIG. 2 and FIG. 3, and only required is that the grooved member Gr1 is arranged near the center (centripetal side) of the mat member Pm1. Specifically, the slit member S and the grooved member Gr1 can be formed in an arbitrary point within a range between positions where the inter slit member—grooved member line Lsg is about parallel to the short side Lsm of the mat member Pm1 (FIG. 2 and FIG. 3) and is about parallel (not shown) to the long side Llm of the mat member Pm1. In terms of a uniformly retaining of the water absorbent sheet Sa1 by the retaining member Pr1, the retaining members Pr1 located on the four corners of the mat member Pm1 are preferably arranged on such positions that the inter slit member—grooved member line Lsg is about parallel to the diagonal lines of the mat member Pm1. The cross sectional shape of the grooved member Gr1 (groove Gr1a and groove Gr1b) is not limited to a rectangular shape but V shape or U shape is also allowed.

It is allowed to provide a circular step (not shown) in a predetermined height on the underside of the claws Psru between the end portions Pes of the slits SL1, SL2, and SL3 and the peripheral wall Wr. Provision of the circular step in the underside of the claws Psru increases the thickness of intermediate portion between the peripheral wall Wr and the root (girth) of the claws Psru, and then improves a structural strength of the retaining member Pr1.

Since the retaining member Pr1 is made of flexible material, the user can easily insert the end portion Esa of the water absorbent sheet Sa1 into the slit member S comprised of the slits SL1, SL2, and SL3. The water absorbent sheet Sa1 is retained by the top surfaces Sru due to a friction force working between the end portion Esa of water absorbent sheet Sa1 and the plural claws Psru. Since the end portion Pes of each of the slits SL1, SL2, and SL3 is formed in a circular arc shape having a predetermined radius of curvature, the retaining member Pr1 is hardly lacerated in the root of claw Psru even if the water absorbent sheet Sa1 is installed and uninstalled repeatedly.

It is not limited that the retaining member Pr1 (or the peripheral wall Wr) should be in a tubular shape, but in any shape comprised of a top surface wherein the slit member and the grooved member are provided and a side wall supporting the top surface. The retaining member Pr1 may be formed in a prism having a polygon base, such as a rectangle, as will be described with reference to FIG. 7.

The number of slits defining the slit member S is not limited to three, and any number is acceptable if the slit member S can hold the water absorbent sheet Sa1 by plural number of the claws Psru. More specifically, one slit is enough to define the slit member S, and then the maximum number of slits can be properly determined in consideration of the required strength and the material of the top surface Sru.

The number of grooves defining the grooved member Gr1 is not limited to two, and any number is acceptable if the end portion Esa of the water absorbent sheet Sa1 can be easily held between the upper surface of the claw with groove Psrua and the bottom surface of the claw without groove Psrub. More specifically, one groove is enough to define the grooved member Gr1, and then the maximum number of grooves can be properly determined in consideration of the required strength and the material of the top surface Sru.

Figure 5:
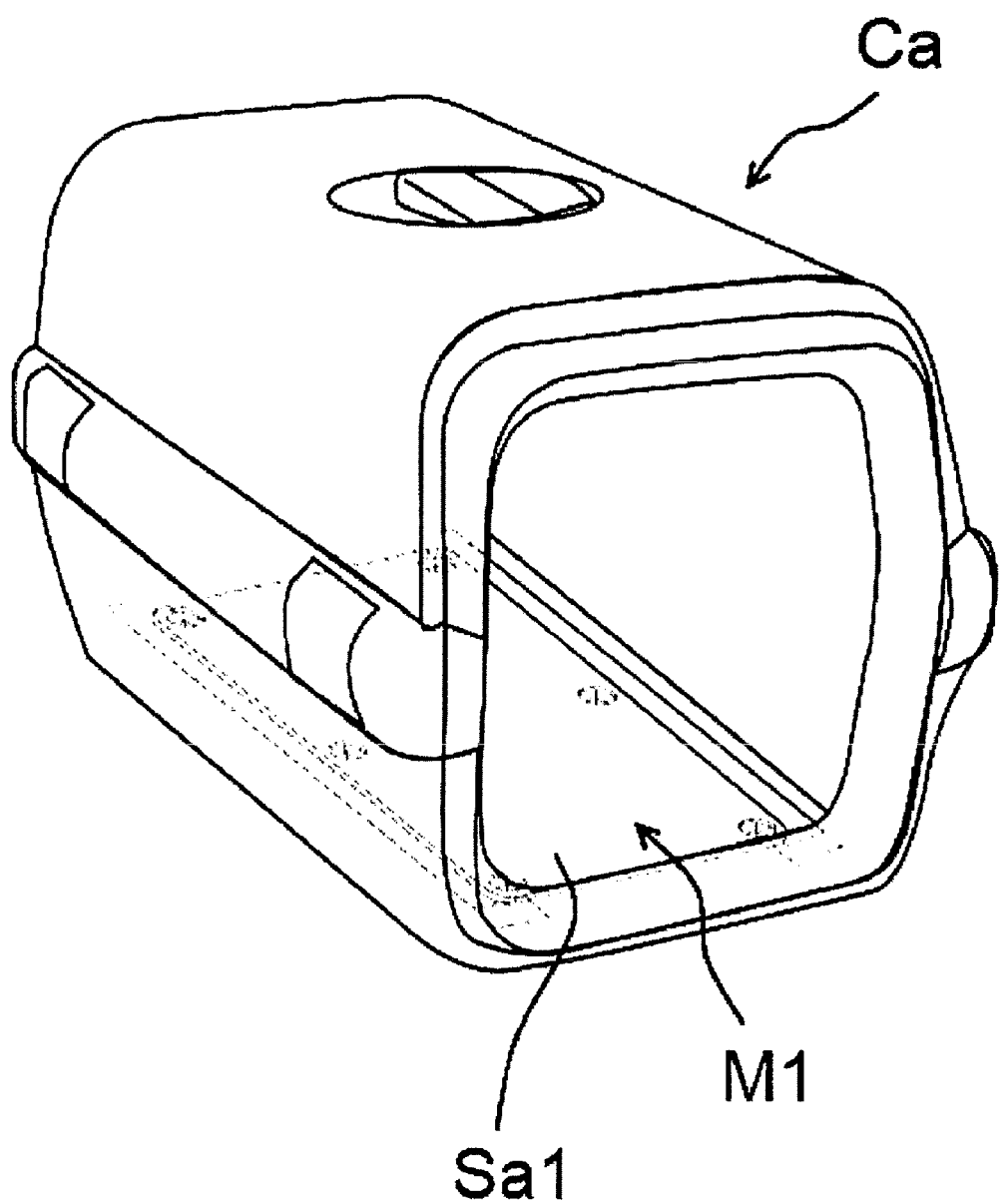
FIG. 5 is a perspective view of a carrier accommodating the water absorbent sheet retaining mat depicted in FIG. 1 placed therein.

The water absorbent sheet retaining mat M1 having the above described construction is suitable for being placed inside a so-called "carry" which is a boxy transporting goods for use in accommodation or conveyance of a pet. In FIG. 5, shown is a state in which the water absorbent sheet retaining mat M1 is placed inside the carry Ca. The water absorbent sheet retaining mat M1 with the water absorbent sheet Sa1 retained thereby is laid on the inner bottom surface of the carry Ca such that the laying plane St faces upward. The end portion Esa of the water absorbent sheet Sa1 is caught between the sitting plane Sb and the inner bottom surface of the carry Ca. Therefore, even when the pet splashes the urine onto the inner wall of the carry Ca, the end portion Esa of the water absorbent sheet Sa1 absorbs the urine falling down along the inner wall. In addition, as described in the above, the water absorbent sheet retaining mat M1 is made with a flexible material, facilitating its placement inside the carry Ca. Furthermore, the mat member Pm1 having flexibility deforms along the inner surface (inner bottom surface and inner wall) of the carry Ca, and can be applied to such a carry Ca with an inner bottom surface smaller than the outer contour of the mat member Pm1.

Next, with reference to FIG. 6, FIG. 7, FIG. 8, FIG. 9, and FIG. 10 in turn, described are alternative embodiments of the retaining member Pr1.

Figure 6:
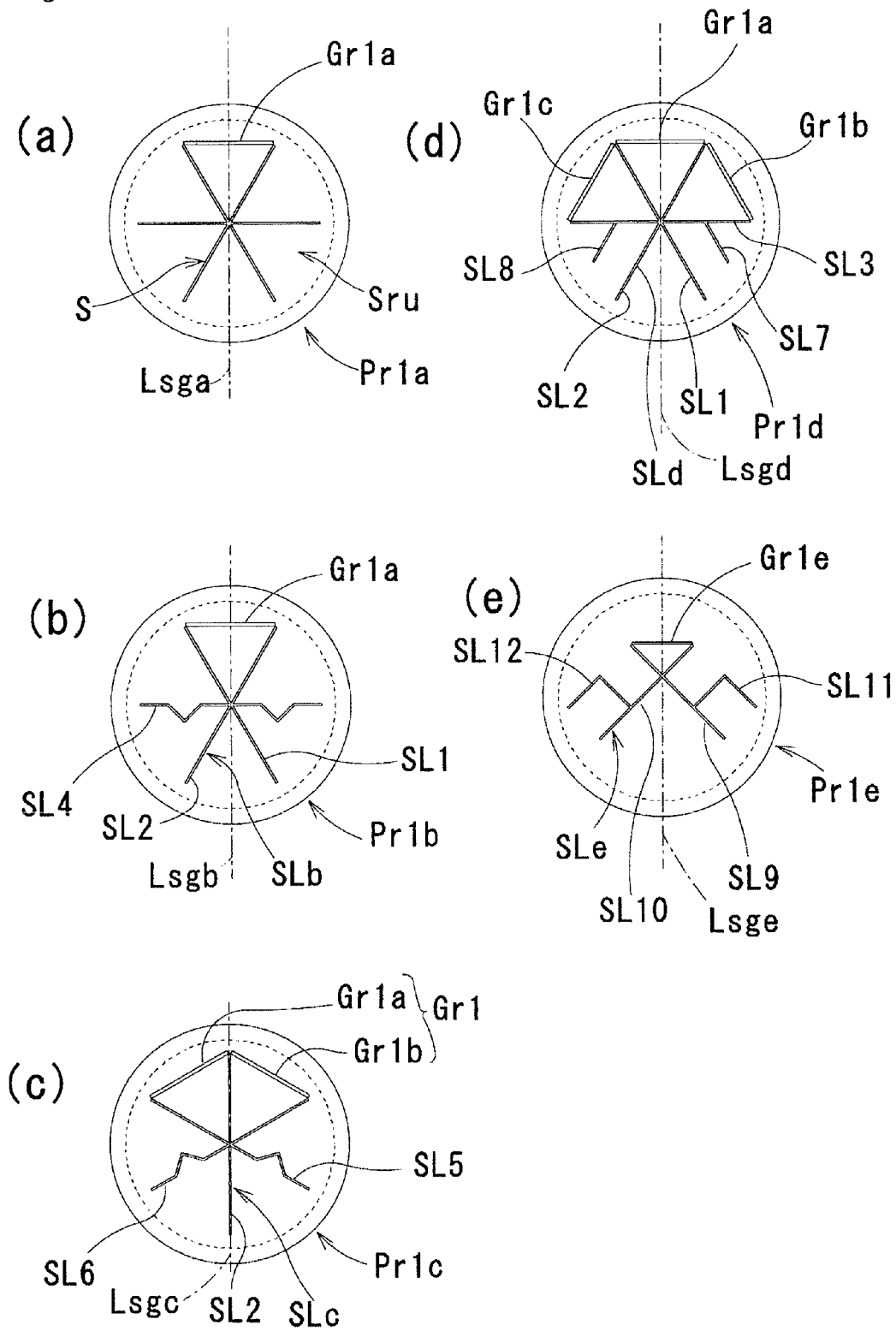
FIG. 6 is a plan view showing a first alternative embodiment of the retaining member depicted in FIG. 3.

First, with reference to FIG. 6, a first alternative embodiment of the retaining member Pr1 is described. The retaining members Pr1$a$, Pr1$b$, Pr1$c$, Pr1$d$, and Pr1$e$ according to this alternative embodiment each has a construction similar to that of the retaining member Pr1 depicted in FIG. 3 except shapes of the slit member and the grooved member. The shapes of the slit member and the grooved member are intensively described below.

The retaining member Pr1$a$ shown in FIG. 6($a$) has a construction similar to that of the retaining member Pr1 (FIG. 3) except that a grooved member is comprised of a single of groove Gr1$a$. The slit member S and the groove Gr1$a$ of the retaining member Pr1$a$ can be formed in an arbitrary point within a range between positions where an inter slit member—grooved member line Lsga bisecting the groove Gr1$a$ is about parallel (FIG. 2 and FIG. 3) to the short side Lsm of the mat member Pm1 as the inter slit member—grooved member line Lsg of the retaining member Pr1 (FIG. 3) is, and is about parallel (not shown) to the long side Llm of the mat member Pm1.

The retaining member Pr1$b$ shown in FIG. 6($b$) has a construction similar to that of the retaining member Pr1$a$ (FIG. 6($a$)) except that the slit member S is replaced with a slit member SLb. The slit member SLb is comprised of three slits SL1, SL2, and SL4 intersecting each other as the slit member S is. The slits SL1 and SL2 are formed in a straight line like shape whereas the slit SL4 is formed in a polygonal line like shape. The slit member SLb and the Groove Gr1$a$ of the retaining member Pr1$b$ can be formed in an arbitrary point within a range between positions where an inter slit member—grooved member line Lsgb bisecting the groove Gr1$a$ is about parallel to the short side Lsm of the mat member Pm1 and is about parallel to the long side Llm of the mat member Pm1.

The retaining member Pr1$c$ shown in FIG. 6($c$) has a construction similar to that of the retaining member Pr1 (FIG. 3) except that the slit member S is replaced with a slit member SLc. The slit member SLc is comprised of three slits SL2, SL5, and SL6 intersecting each other as the slit member S is. The slit SL2 is formed in a straight line like shape whereas the slits SL5 and SL6 are formed in a polygonal line like shape. The slit member SLc and the grooved member Gr1 of the retaining member Pr1$c$ can be formed in an arbitrary point within a range between positions where an inter slit member—grooved member line Lsgc bisecting the grooved member Gr1 is about parallel to the short side Lsm of the mat member Pm1 and is about parallel to the long side Llm of the mat member Pm1.

The retaining member Pr1$d$ shown in FIG. 6($d$) has a construction similar to that of the retaining member Pr1 (FIG. 3) except that the grooved member has three units of groove as well as the slit member S is replaced with a slit member SLd. The grooved member is comprised of grooves Gr1$a$, Gr1$b$, and Gr1$c$. The slit member SLd includes three slits SL1, SL2, and SL3 intersecting each other, and slits SL7 and SL8. One end of the slits SL7 and SL8 respectively communicates with the slit SL3. The slit SL7 is about parallel to the slit SL1, and the slit SL8 is about parallel to the slit SL2. The slit member SLd and the grooves Gr1$a$, Gr1$b$, and Gr1$c$ of the retaining member Pr1$d$ can be formed in an arbitrary point within a range between positions where an inter slit member—grooved member line Lsgd bisecting the groove Gr1$a$ is about parallel to the short side Lsm of the mat member Pm1 and is about parallel to the long side Llm of the mat member Pm1.

The retaining member Pr1$e$ shown in FIG. 6($e$) has a construction similar to that of the retaining member Pr1$a$ (FIG. 6($a$)) except that the groove Gr1$a$ is replaced with a groove Gr1$e$ as well as the slit member S is replaced with a slit member SLe. The slit member SLe includes two slits SL9 and SL10 intersecting each other and slits SL11 and SL12. The slit SL11 is formed in a polygonal line like shape, and whose one end communicates with the slit SL9. The slit SL12 is also formed in a polygonal line like shape, and whose one end communicates with the slit SL10. The slit member SLe and the groove Gr1e of the retaining member Pr1e can be formed in an arbitrary point within a range between positions where an inter slit member—grooved member line Lsge bisecting the groove Gr1e is about parallel to the short side Lsm of the mat member Pm1 and is about parallel to the long side Llm of the mat member Pm1.

Figure 7:
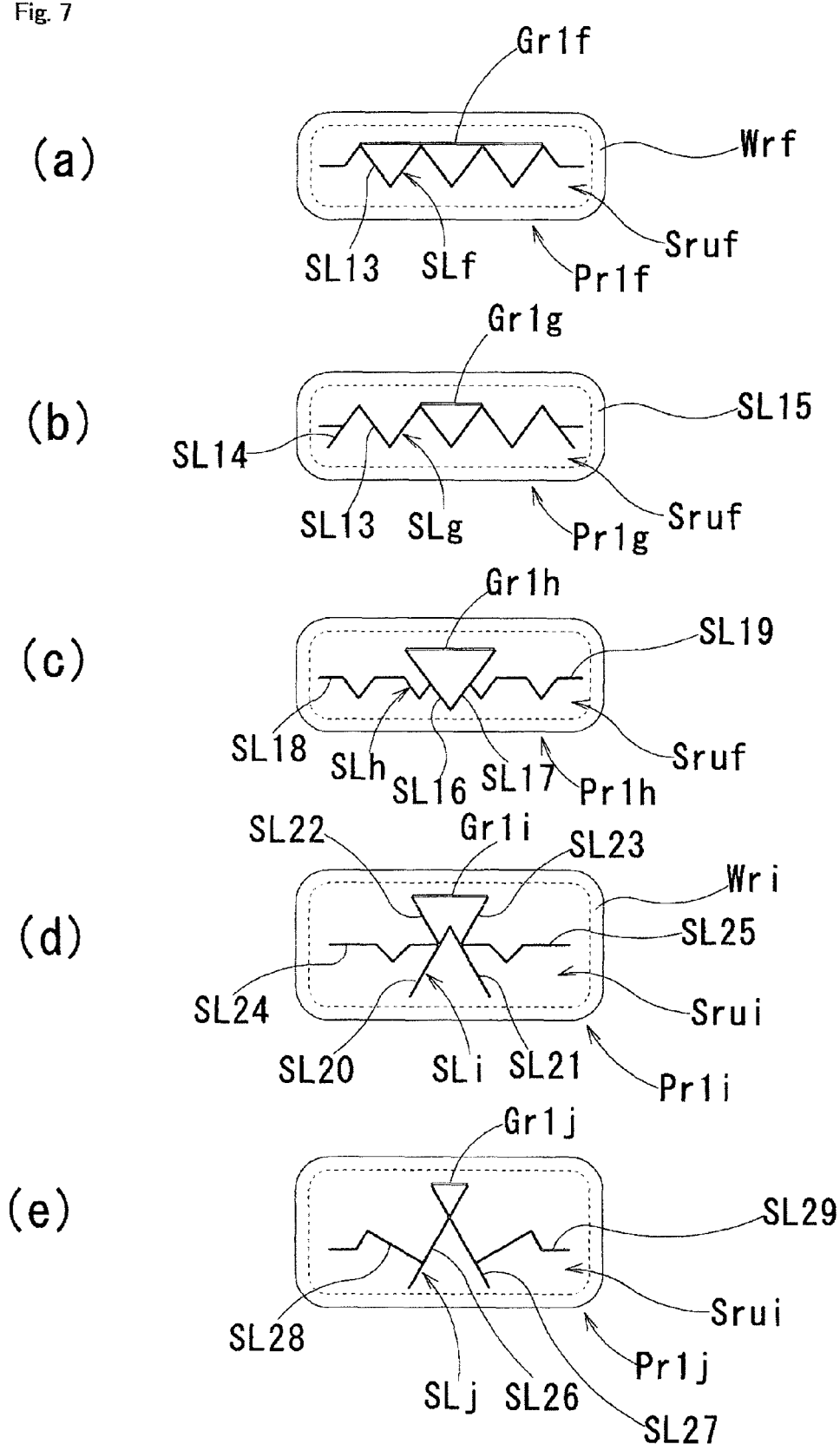
FIG. 7 is a plan view showing a second alternative embodiment of the retaining member depicted in FIG. 3.

Next, with reference to FIG. 7, described is a second alternative embodiment of the retaining member Pr1. The retaining members Pr1f, Pr1g, Pr1h, Pr1i, and Pr1j according to this alternative embodiment have prism like shapes, provided with upper surfaces where the slit member and the grooved member are formed and side walls supporting the upper surfaces as the retaining member Pr1 (FIG. 3) and the retaining members Pr1a, Pr1b, Pr1c, Pr1d, and Pr1e (FIG. 6) do.

Note that the retaining members Pr1 (FIG. 3) formed in a tubular shape are provided on the end and about the center (FIG. 2) of the long side Llm of the mat member Pm1 whereas the retaining members Pr1f, Pr1g, Pr1h, Pr1i, and Pr1j according to this alternative embodiment are provided on about the centers of the long side Llm (or, the short side Lsm) of the mat member Pm1.

The retaining member Pr1f shown in FIG. 7(a) is comprised of a top surface Sruf formed in a rounded rectangular shape and a side wall Wrf supporting the top surface Sruf. In the top surface Sruf, formed are a slit member SLf and a groove Gr1f. The slit member SLf is defined by a slit SL13 formed in a polygonal line like shape.

The retaining member Pr1g shown in FIG. 7(b) has a construction similar to that of the retaining member Pr1f (FIG. 7(a)) except that the groove Gr1f is replaced with a groove Gr1g as well as the slit member SLf is replaced with a slit member SLg. The slit member SLg includes the slit SL13, as well as slits SL14 and SL15. One end of the slits SL14 and SL15 respectively communicate with the slit SL13.

The retaining member Pr1h shown in FIG. 7(c) has a construction similar to that of the retaining member Pr1g (FIG. 7(b)) except that the groove Gr1g is replaced with a groove Gr1h as well as the slit member SLg is replaced with a slit member SLh. The slit member SLh includes two units of slit SL16 and SL17 formed in a straight line like shape and two units of slit SL18 and SL19 formed in a polygonal line like shape. One end of the slit SL18 communicates with the slit SL16. One end of the slit SL19 communicates with the slit SL17.

The retaining member Pr1i shown in FIG. 7(d) has a top surface Srui formed in a rounded rectangular shape and a side wall Wri supporting the top surface Srui. Formed in the top surface Srui are a slit member SLi and a groove Gr1i. The slit member SLi includes four units of slit SL20, SL21, SL22, and SL23 formed in a straight line like shape, and two units of slit SL24 and SL25 formed in a polygonal line like shape. Respective one end of the slits SL22 and SL24 communicates with the slit SL20. Respective one end of the slit SL23 and SL25 communicates with the slit SL21.

The retaining member Pr1j shown in FIG. 7(e) has a construction similar to that of the retaining member Pr1i (FIG. 7(d)) except that the groove Gr1i is replaced with a groove Gr1j as well as the slit member SLi is replaced with a slit member SLj. The slit member SLj includes two units of slit SL26 and SL27 formed in a straight line like shape intersecting each other and two units of slit SL28 and SL29 formed in a polygonal line like shape. One end of the slit SL28 communicates with the slit SL26. One end of the slit SL29 communicates with the slit SL27.

The slit members and grooves formed in the retaining members Pr1f, Pr1g, Pr1h, Pr1i, and Pr1j according to the second alternative embodiment can be formed in an arbitrary point within a range between positions where a line (not shown) bisecting the grooves Gr1f, Gr1g, Gr1h, Gr1j, and Gr1i is about parallel (FIG. 2 and FIG. 3) to the short side Lsm of the mat member Pm1 and is about parallel (not shown) to the long side Llm of the mat member Pm1 as same as in the above described first alternative embodiment.

Figure 8:
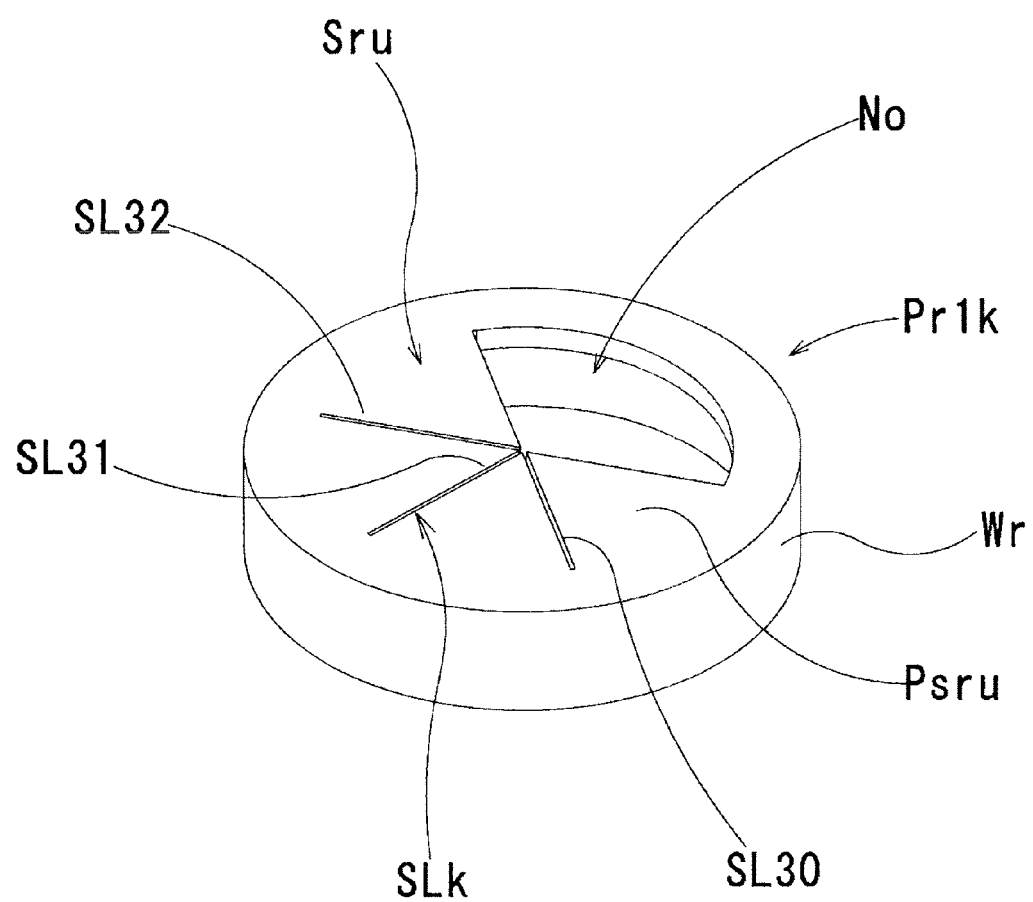
FIG. 8 is a perspective view showing a third alternative embodiment of the retaining member depicted in FIG. 3.

Next, with reference to FIG. 8, described is a third alternative embodiment of the retaining member Pr1. A retaining member Pr1k according to this alternative embodiment has a construction similar to that of the retaining member Pr1 depicted in FIG. 3 except that the slit member S is replaced with a slit member SLk as well as a notch No is formed in the top surface Sru instead of the grooved member.

The slit member SLk includes three units of linearly shaped slit SL30, SL31, and SL32. In the top surface Sru, the notch No in a fan-like shape is formed between lines each extending from the slit SL30 and the slit SL32. In the top surface Sru, four pieces of the claw Psru are defined by the notch No and the slits SL30, SL31, and SL32. The slit member SLk and the notch No of the retaining member Pr1k can be formed in an arbitrary point within a range between positions where a line (not shown) bisecting the notch No is about parallel (FIG. 2 and FIG. 3) to the short side Lsm of the mat member Pm1 and is about parallel (not shown) to the long side Llm of the mat member Pm1.

Figure 9:
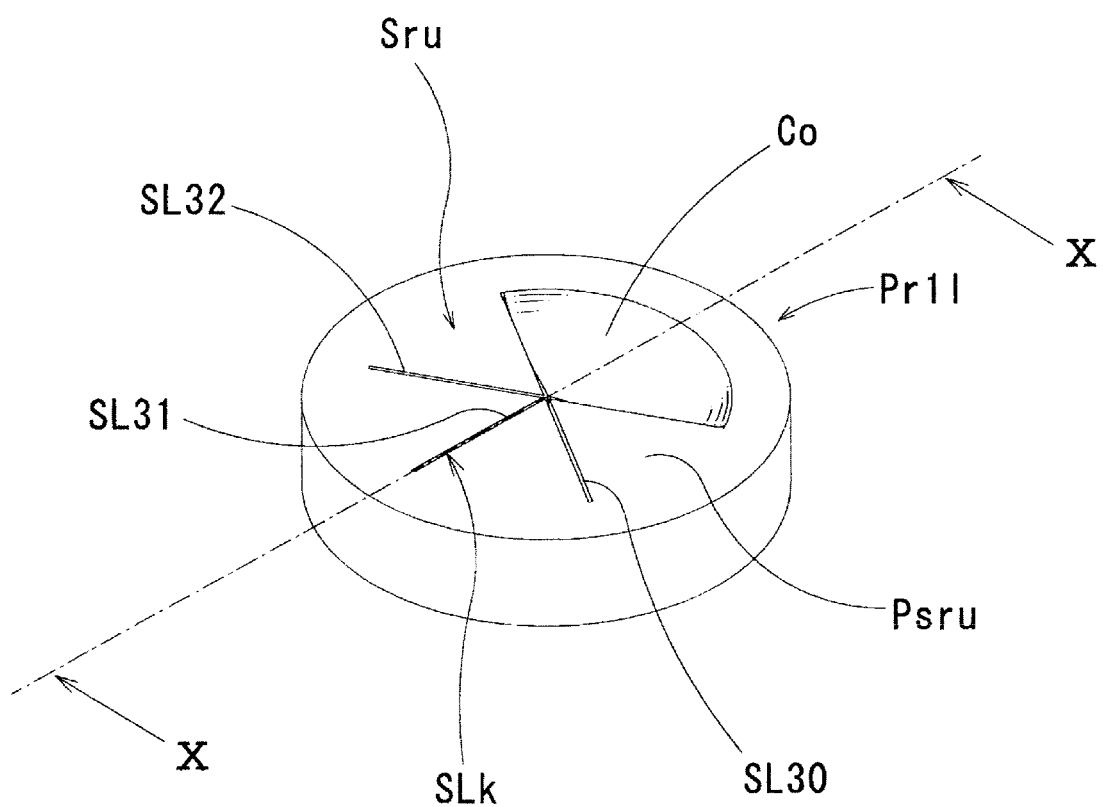
FIG. 9 is a perspective view showing a fourth alternative embodiment of the retaining member depicted in FIG. 3.
Figure 10:
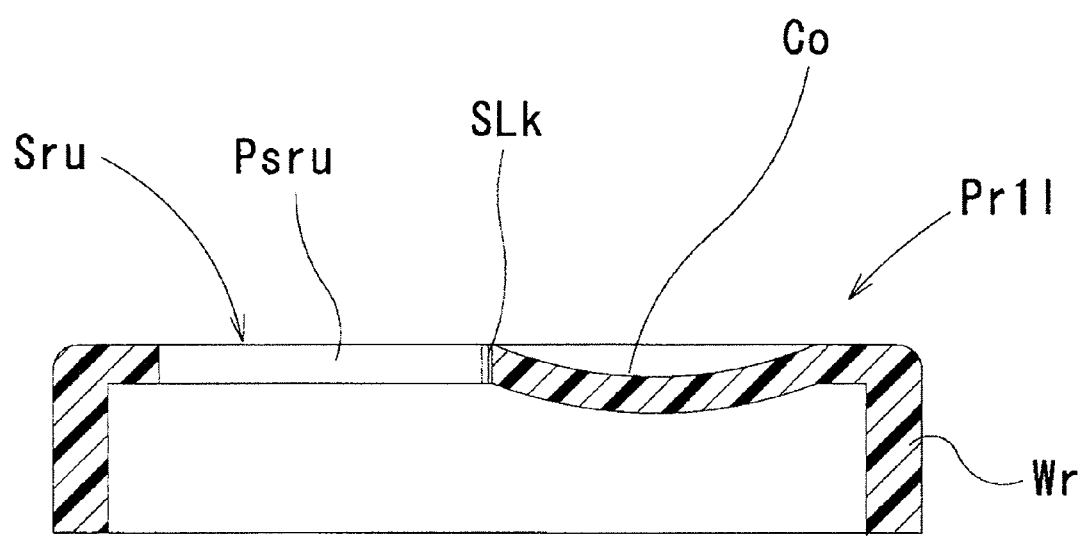
FIG. 10 is a diagram showing a cross section structure of the retaining member depicted in FIG. 9.

Next, with reference to FIG. 9 and FIG. 10, described is a fourth alternative embodiment of the retaining member Pr1. A retaining member Pr1l according to this alternative embodiment has a construction similar to that of the retaining member Pr1k depicted in FIG. 8 except that a concave surface Co is formed in the top surface Sru instead of the notch No.

In the top surface Sru, a fan-like shaped area between the line extended from the slit SL30 and the line extended from the slit SL32 curves toward the bottom surface of the claw Psru and forms the concave surface Co. FIG. 10 shows a sectional structure of the retaining member Pr1l taken along a line X-X in FIG. 9. The slit member SLk and the concave surface Co can be formed in an arbitrary point within a range between positions where a line (corresponding to the line X-X in FIG. 9) bisecting the concave surface Co is about parallel to the short side Lsm of the mat member Pm1 (FIG. 2 and FIG. 3) and is about parallel (not shown) to the long side Llm of the mat member Pm1.

It is to be noted that the above described first alternative embodiment (FIG. 6), the second alternative embodiment (FIG. 7), the third alternative embodiment (FIG. 8), and the fourth alternative embodiment (FIG. 9 and FIG. 10) of the retaining member Pr1 can be used in any of the embodiments disclosed in the present specification. Furthermore, the retaining member Pr1 (FIG. 3) and any of the first to the fourth alternative embodiments of the retaining member Pr1 can be combined.

Second Embodiment

Figure 11:
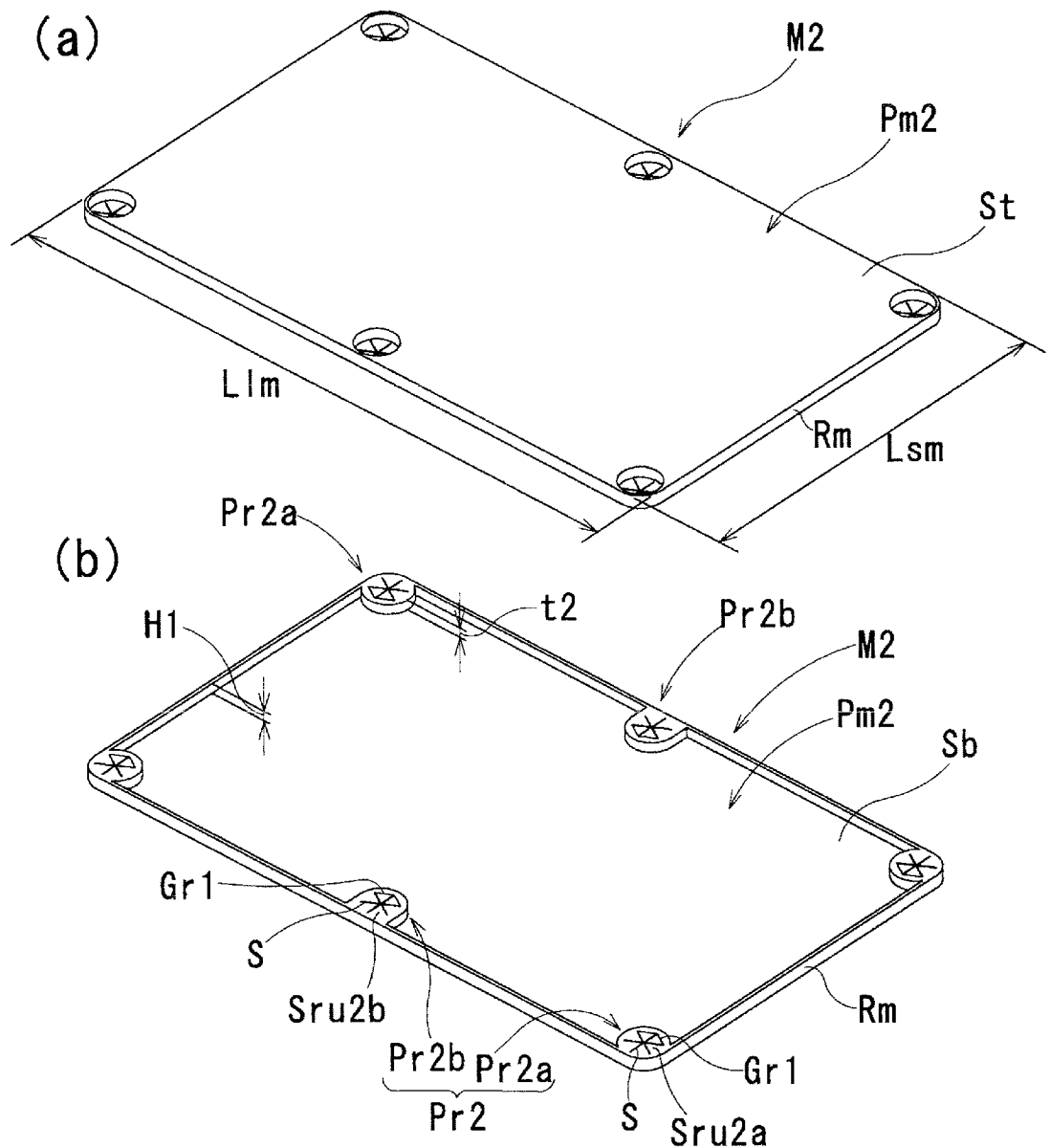
FIG. 11 is a perspective view of a water absorbent sheet retaining mat according to a second embodiment of the present invention.

With reference to FIG. 11, described below is a water absorbent sheet retaining mat according to a second embodiment of the present invention. A water absorbent sheet retaining mat M2 has a construction similar to that of the water absorbent sheet retaining mat M1 (FIG. 2) except that the mat member Pm1 and the retaining member Pr1 (FIG. 2) are replaced with a mat member Pm2 and a retaining member Pr2, respectively. The mat member Pm2 and the retaining member Pr2 are intensively described below.

The mat member Pm2 is integrally provided with a mat frame member Rm rising almost perpendicularly from the peripheral portion of the sitting plane Sb of the above described mat member Pm1 at a predetermined height H1. Thus, the mat member Pm2 is formed in a pan like shape defined by the sitting plane Sb as a bottom and the mat frame member Rm as a peripheral wall.

It is allowed that the mat member Pm2 is made by adhering the mat frame member Rm to the mat member Pm1. However, more preferably, the mat member Pm1 and the mat frame member Rm are integrally formed. In the mat member Pm2, the mat frame member Rm is constructed to satisfy the relationship of H1=t2.

The retaining member Pr2 has a construction similar to that of the retaining member Pr1 except being integrally formed with the mat frame member Rm. Specifically, the retaining member Pr2 and the mat frame member Rm are constructed to share a portion of their respective peripheral walls. The retaining member Pr2 includes four units of retaining member Pr2a and two units of retaining member Pr2b. Each of four units of retaining member Pr2a is provided in the end portion of the long side Llm of the mat member Pm2. Each of two units of retaining member Pr2b is provided in about a center of the long side Llm of the mat member Pm2.

As seen from FIG. 11, the retaining member Pr2a is integrally formed with the mat frame members Rm of the long side Llm as well as the short side Lsm of the mat member Pm2. The retaining member Pr2b is integrally formed with the mat frame member Rm of the long side Llm of the mat member Pm2. In the top surfaces Sru2a and Sru2b of the retaining members Pr2a and Pr2b, formed are the slit member S and the grooved member Gr1, as same as in the retaining member Pr1.

Third Embodiment

Figure 12:
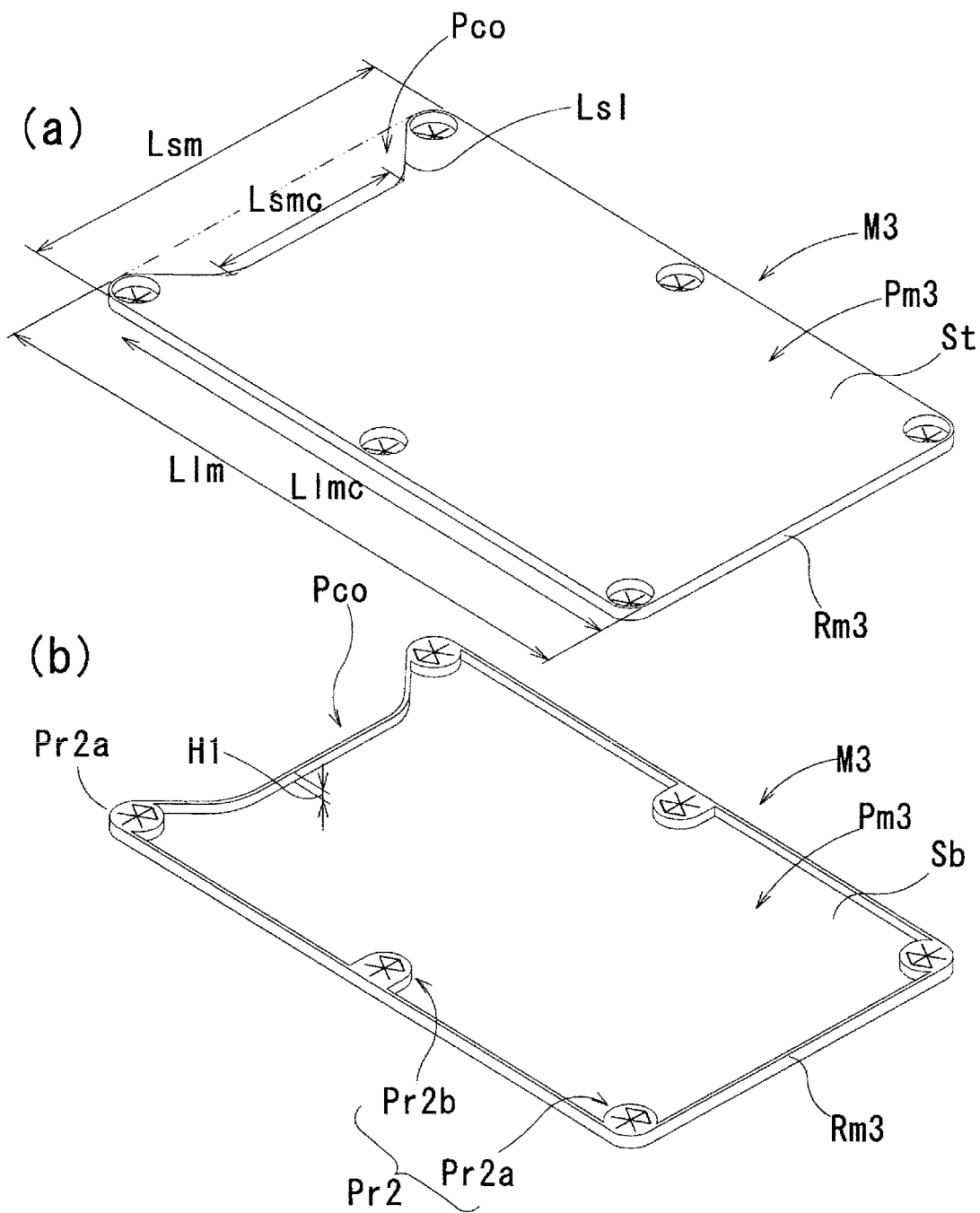
FIG. 12 is a perspective view of a water absorbent sheet retaining mat according to a third embodiment of the present invention.

With reference to FIG. 12, described below is a water absorbent sheet retaining mat according to a third embodiment of the present invention. A water absorbent sheet retaining mat M3 has a construction similar to that of the water absorbent sheet retaining mat M2 (FIG. 11) except that the mat member Pm2 and the mat frame member Rm (FIG. 11) are replaced with a mat member Pm3 and a mat frame member Rm3, respectively. The mat member Pm3 and the mat frame member Rm3 are intensively described below.

The mat member Pm3 has a construction similar to that of the mat member Pm2 except an outer contour thereof. In brief, the mat member Pm2 is formed in a rectangular shape whereas the mat member Pm3 is formed in a concave polygonal shape. In short, the mat member Pm3 has such a contour as that a portion is taken away from the mat member Pm2 in a rectangular shape. In an example shown in FIG. 12, the mat member Pm3 is formed in a concave hexagonal shape that is made by taking a trapezoidal shaped portion from the mat member Pm2 formed in a rectangular shape at one of the short sides Lsm (indicated with two dot chain line). The mat frame member Rm3 is provided integrally with the mat member Pm3 to rise up by a predetermined height H1 almost vertically from the perimeter of the sitting plane Sb of the mat member Pm3 formed in a concave hexagonal shape.

In the mat member Pm3 constructed as described in the above, a space Pco defined by a side Lsmc and a pair of sides Lsl connecting the end of the side Lsmc and the peripheral wall of the retaining member Pr2a is formed on the side of short side where the notch is formed. In other words, two units of retaining member Pr2a confront each other across the space Pco.

The water absorbent sheet retaining mat M3 having the above described construction is also suitable for use as being placed inside the carry as the water absorbent sheet retaining mat M1 (FIG. 2) and M2 (FIG. 11) are. To place the water absorbent sheet retaining mat M3 inside the carry Ca (FIG. 5), preferably the water absorbent sheet retaining mat M3 is laid on the inner bottom surface of the carry Ca such that the side Lsmc is far from an entrance of the carry Ca.

When an contour of the inner bottom surface of the carry Ca is smaller than the outer contour of the mat member Pm3, the mat member Pm3 is bent and placed with the two retaining member Pr2a near the side Lsmc are in contact with the inner wall of the carry Ca. By the space Pco provided between the retaining members Pr2a and Pr2a, the water absorbent sheet retaining mat M3 that is bent along the inner wall of the carry Ca is stably placed. Furthermore, by providing the space Pco, creasing of the water absorbent sheet Sa1 retained to the water absorbent sheet retaining mat M3 can be suppressed. It is also allowed that the notch is formed on the long side Llm of the mat member Pm3 instead of the short side.

Fourth Embodiment

Figure 13:
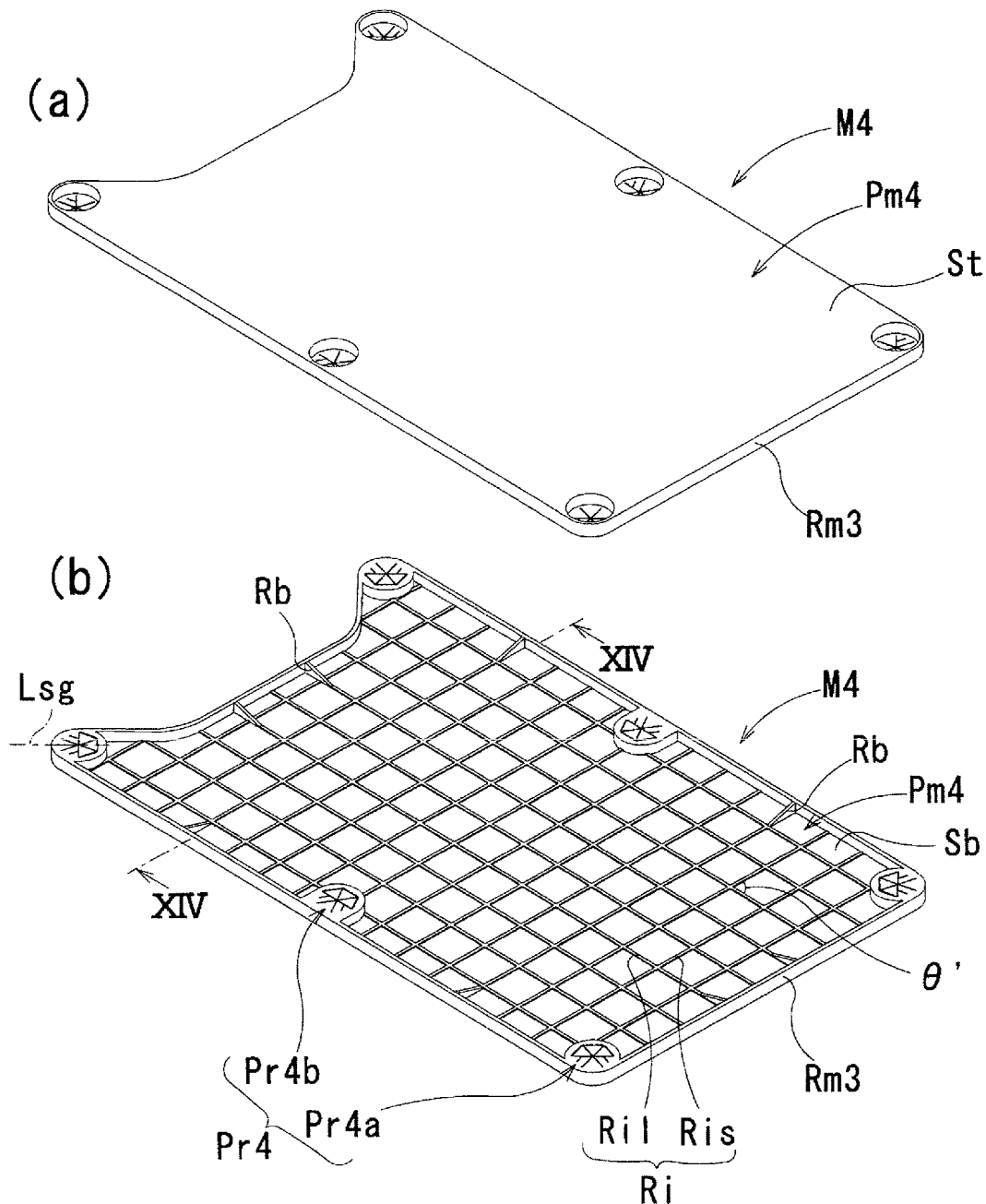
FIG. 13 is a perspective view of a water absorbent sheet retaining mat according to a fourth embodiment of the present invention.
Figure 14:
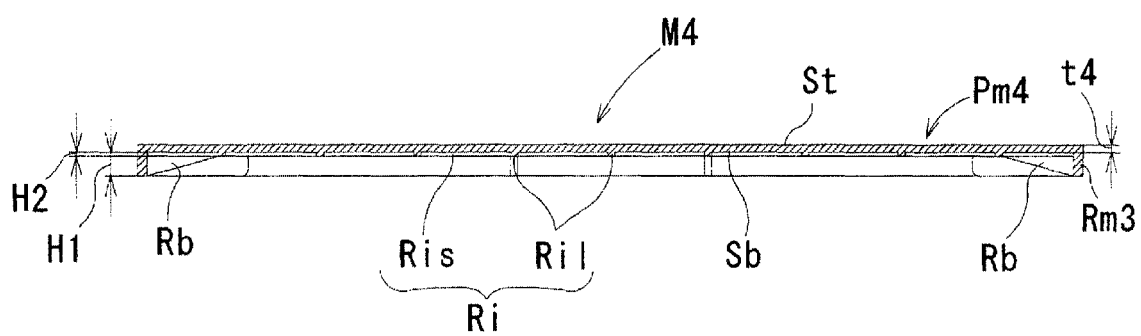
FIG. 14 is a diagram showing a cross section structure of the water absorbent sheet retaining mat depicted in FIG. 13.
Figure 15:
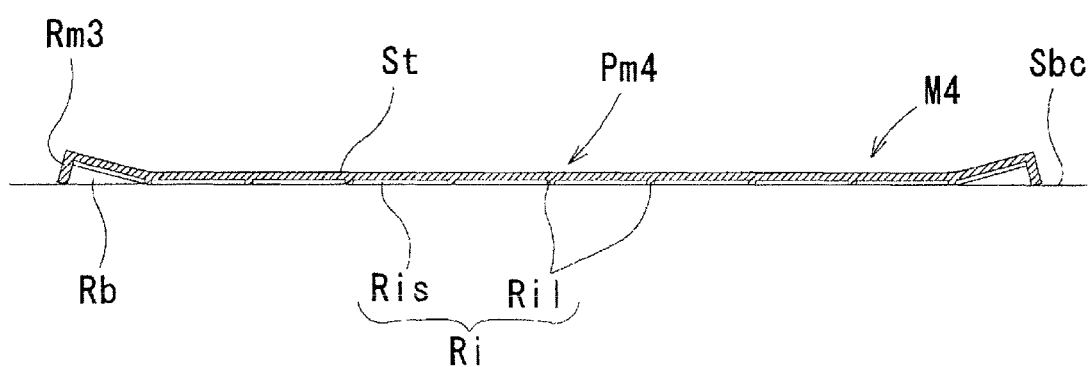
FIG. 15 is a sectional view showing a state in which the water absorbent sheet retaining mat depicted in FIG. 13 is placed.
Figure 16:
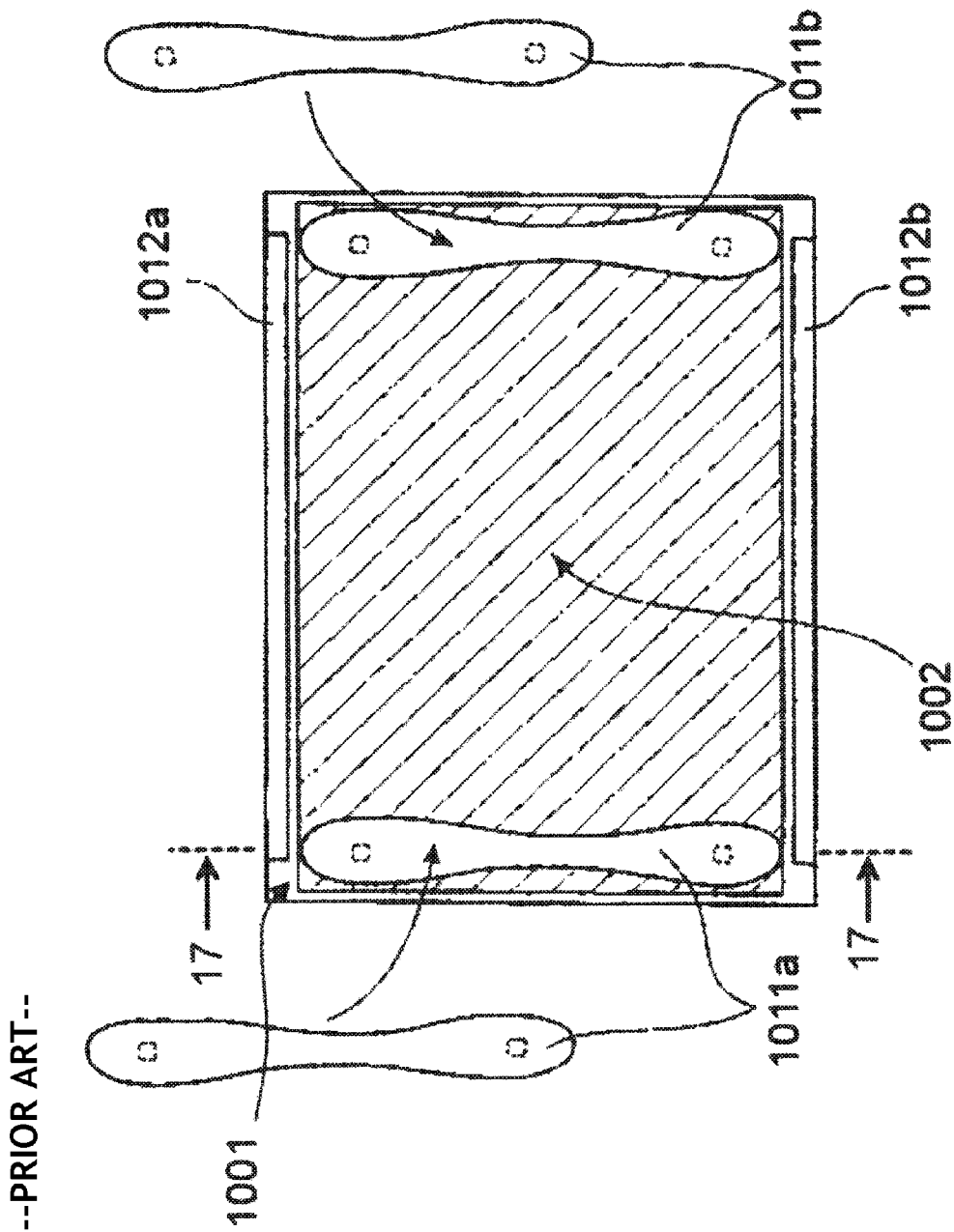
FIG. 16 is a plan view of a toilet mat for a pet proposed by Patent Literature 1.
Figure 17:
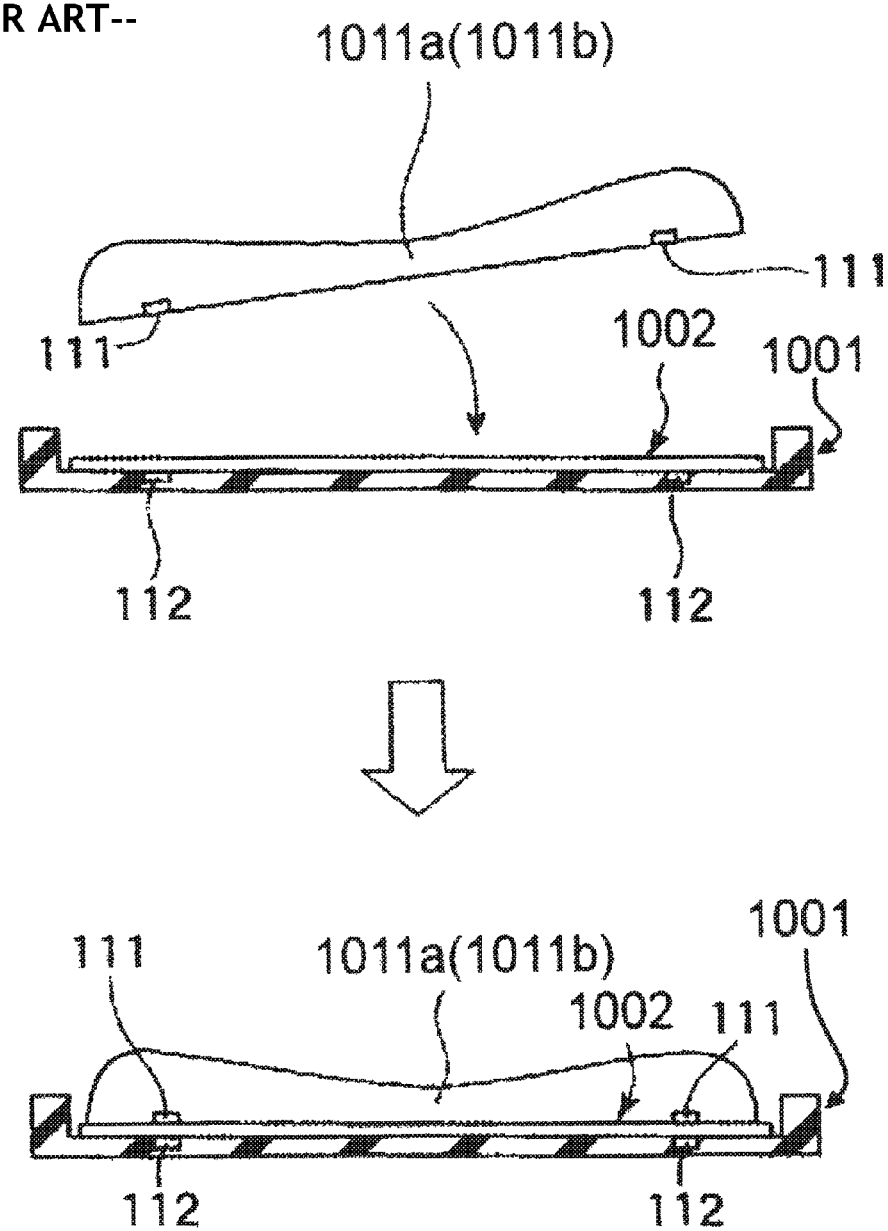
FIG. 17 is a sectional view of the toilet mat for a pet taken along a line 17-17 in FIG. 16.

With reference to FIG. 13, FIG. 14, and FIG. 15, described below is a water absorbent sheet retaining mat according to a fourth embodiment of the present invention. A water absorbent sheet retaining mat M4 has a construction similar to that of the water absorbent sheet retaining mat M3 (FIG. 12) except that the mat member Pm3 (FIG. 12) is replaced with a mat member Pm4. In brief, the mat member Pm4 according to this embodiment is different from the above described mat member Pm3 in that a ridge Ri rising almost perpendicularly from the sitting plane Sb is provided.

As already described in the above, any of the first to the fourth alternative embodiments of the retaining member Pr1 can be used in any of the embodiments disclosed in the present specification. A retaining member Pr4 according to this embodiment has a construction similar to that of the above described retaining member Pr2 (FIG. 12) except shapes of the slit member and the grooved member formed in the top surface thereof. The shapes of the slit member and the grooved member formed in the top surface of the retaining member Pr4 are similar to those of the above described slit member SLd and the grooved member comprised of grooves Gr1a, Gr1b, and Gr1c formed on the retaining member Pr1d (FIG. 6(d)). Further, retaining members Pr4a are arranged in the four corners of the mat member Pm4 such that the inter slit member—grooved member line Lsg forms about forty five degrees with the long side Llm of the mat member Pm4.

The mat member Pm4 is intensively described below. The mat member Pm4 is integrally provided with at least one ridge Ri rising by a predetermined height H2 (FIG. 14) almost perpendicularly from the sitting plane Sb. In an example depicted in FIG. 13, the ridge Ri includes a plurality of ridges Ril and ridges Ris intersecting each other with a predetermined angle θ'. The ridge Ril extends about parallel to the long side Llm of the mat member Pm4. The ridge Ris extends about parallel to the short side Lsm of the mat member Pm4. The mat member Pm4 is further provided with a reinforcement rib Rb connecting the ridges Ri and an inner peripheral wall of the mat frame member Rm3. The ridges Ri function to stop the sitting plane Sb slipping from the plane on which the water absorbent sheet retaining mat M4 is laid. This will be described later with reference to FIG. 14 and FIG. 15.

FIG. 14 shows a cross sectional construction of the water absorbent sheet retaining mat M4 taken along a line XIV-XIV in FIG. 13. For the convenience of explanation, the cross sectional construction of the water absorbent sheet retaining mat M4 is depicted such that the laying plane St faces upward. FIG. 15 shows a cross sectional construction of the water absorbent sheet retaining mat M4 laid on a predetermined plane taken along a line corresponding to the line XIV-XIV in FIG. 13. For the convenience of explanation, the cross sectional construction of the water absorbent sheet retaining mat M4 is depicted such that the laying plane St faces upward.

As recognized from FIG. 14, the height H2 of the ridge Ri is smaller than the height H1 of the mat frame member Rm3. The reinforcement rib Rb is about a triangular shape, and is formed integrally with the ridge Ris in the illustrated example. The reinforcement rib Rb is provided so as to connect a surface, depicted lower in the figure, of the ridge Ris and the end, depicted lower in the figure, of the inner peripheral wall of the mat frame member Rm3.

The mat member Pm4 constructed as described is increased in the structural strength thereof due to the provision of the ridge Ri and the reinforcement rib Rb. Therefore, even if a thickness t4 of the mat member Pm4 is set to a value smaller than the thickness t1 of the mat members Pm1 (FIG. 2), Pm2 (FIG. 11), and Pm3 (FIG. 12), the strength equal to those of the mat members Pm1, Pm2, and Pm3 is achieved.

Shown in FIG. 15 is a cross sectional structure of the water absorbent sheet retaining mat M4 placed on an inner bottom surface Sbc of the carry Ca. The mat member Pm4 having flexibility extends along the inner bottom surface Sbc and contacts with the inner bottom surface Sbc at places of an end, depicted lower in the figure, of the peripheral wall of the mat frame member Rm3, a surface, depicted lower in the figure, of the reinforcement rib Rb, and the ridge Ril and a surface, depicted lower in the figure, of the ridges Ril and Ris.

A contact area of the mat member Pm4 and the inner bottom surface Sbc is smaller than a contact area of the inner bottom surface Sbc and the mat members Pm1, Pm2, and Pm3 with no ridge or no reinforcement rib provided therein. Therefore, a load per unit area acting on the mat member Pm4 is greater than loads acting on the mat members Pm1, Pm2, and Pm3. A friction force acting between the mat member Pm4 and the inner bottom surface Sbc is greater than those acting between the inner bottom surface Sbc and the mat members Pm1, Pm2, and Pm3, and functions as a slip stopper for the mat member Pm4 against the inner bottom surface Sbc.

It is needless to say that the ridge Ri or the reinforcement rib Rb can be provided on the mat member Pm1 or the mat member Pm2.

INDUSTRIAL APPLICABILITY

The present invention is applicable to a water absorbent sheet retaining mat that can retain a water absorbent sheet stably.

REFERENCE SIGNS LIST

M1, M2, M3, M4 water absorbent sheet retaining mat
Pm1, Pm2, Pm3, Pm4 mat member
St laying plane
Sb sitting plane
Rm, Rm3 mat frame member
Pr1, Pr1a, Pr1b, Pr1c, Pr1d, Pr1e, Pr1f, Pr1g, Pr1h, Pr1i, Pr1j, Pr1k, Pr1l, Pr2, Pr2a, Pr2b, Pr4, Pr4a, Pr4b retaining member
Sru top surface
S, SLb, SLc, SLd, SLe, SLf, SLg, SLh, SLi, SLj slit member (cut)
SL1, SL2, SL3 slit
Pes end of slit
Psru, Psrua, Psrub claw
Wr peripheral wall
Gr1 grooved member
Gr1a, Gr1b groove
Lsg inter slit member—grooved member line
Sa1 absorbent sheet
Esa end portion of water absorbent sheet
Spa water absorption area
Spr sheet brim member
Spc corner portion
Lpr sheet brim width
Lss short side of water absorbent sheet
Lls long side of water absorbent sheet
Lsm short side of mat member
Llm long side of mat member
H1 height of mat frame member
H2 ridge height
No notch
Co concave surface
Ri, Ril, Ris ridge
Rb reinforcement rib
Di inner diameter of retaining member
Do outer diameter of retaining member
Ca carry

The invention claimed is:

1. A water absorbent sheet retaining mat for retaining a water absorbent sheet having a first polygonal contour, comprising:
a mat member having a second polygonal contour defined by mutually opposing a first main plane and a second main plane; and
a plurality of retaining members, wherein each of the retaining members have a slit member comprised of at least one slit formed in a top surface at a first predetermined height from the second main plane for accepting a part of a perimeter of the water absorbent sheet being inserted therein,
and each of the retaining members being defined by a respective raised portion of a plurality of raised portions, wherein each of the raised portions is intermittently spaced from each other on the second main plane of the mat member, wherein the second main plane is a plane configured to contact a place where the water absorbent sheet retaining mat is sitting, and
wherein the first main plane of the mat member is configured to support the water absorbent sheet.

2. A mat assembly including the water absorbent sheet retaining mat according to claim 1 and the water absorbent sheet, wherein the first polygonal contour is bigger than the second polygonal contour.

3. A mat assembly including the water absorbent sheet retaining mat according to claim 1 and the water absorbent sheet, the water absorbent sheet including:
a water absorption member having a third polygonal contour smaller than the first polygonal contour; and
a sheet brim member having the first polygonal contour and surrounding the water absorption member,
wherein a distance between the center of the slit member and the second polygonal contour is smaller than a distance between the third polygonal contour and the first polygonal contour.

4. The water absorbent sheet retaining mat according to claim 1, further comprising a mat frame member formed around the mat member at a second predetermined height from the second main plane.

5. The water absorbent sheet retaining mat according to claim 1, wherein a grooved member comprised of at least one groove extending between two neighboring slits of the slit member is formed in the top surface of the retaining member, and
wherein the grooved member is defined by a formation that is a separate formation from the slit member.

6. The water absorbent sheet retaining mat according to claim 5, wherein the grooved member is located on centripetal side of the mat member in the top surface of the retaining member.

7. The water absorbent sheet retaining mat according to claim 5, wherein when continuous two sides of the second polygonal contour adjacent to the retaining member intersecting with a predetermined angle $\theta°$ are regarded as a first side and a second side, respectively, a line connecting a center point of the grooved member and a center of the slit member crosses the first side and the second side at an angle within a range from $0°$ to $\theta°$.

8. The water absorbent sheet retaining mat according to claim 1, wherein the mat member has at least one of first ridge rising up almost perpendicularly from the second main plane by a third predetermined height lower than the first predetermined height.

9. The water absorbent sheet retaining mat according to claim 8, wherein the mat member further has at least one of second ridge rising up almost perpendicularly from the second main plane by the third predetermined height lower than the first predetermined height and crossing the first ridge at a predetermined angle.

10. The water absorbent sheet retaining mat according to claim 8, wherein the third predetermined height is smaller than the second predetermined height.

11. The water absorbent sheet retaining mat according to claim 8, wherein the mat member is provided with a mat frame member that protrudes vertically from the second main plane of the mat member, and the mat member further comprising a reinforcement rib connecting the ridge and an inner peripheral wall of the mat frame member.

* * * * *